(12) United States Patent
Agiwal et al.

(10) Patent No.: US 10,721,600 B2
(45) Date of Patent: Jul. 21, 2020

(54) APPARATUS AND METHOD FOR CONTROLLING TRANSMISSION AND RECEPTION IN A WIRELESS COMMUNICATION SYSTEM

(71) Applicant: Samsung Electronics Co., Ltd., Suwon-si, Gyeonggi-do (KR)

(72) Inventors: Anil Agiwal, Suwon-si (KR); Youngbin Chang, Anyang-si (KR); Kyungkyu Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 121 days.

(21) Appl. No.: 15/364,887

(22) Filed: Nov. 30, 2016

(65) Prior Publication Data

US 2017/0164169 A1 Jun. 8, 2017

(30) Foreign Application Priority Data

Dec. 2, 2015 (KR) .................... 10-2015-0170432

(51) Int. Cl.
*H04W 4/12* (2009.01)
*H04W 4/02* (2018.01)
*H04W 40/02* (2009.01)

(52) U.S. Cl.
CPC ............. *H04W 4/12* (2013.01); *H04W 4/023* (2013.01); *H04W 40/02* (2013.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/21* (2018.01); *Y02D 70/26* (2018.01); *Y02D 70/30* (2018.01)

(58) Field of Classification Search
CPC ......... H04W 4/00; H04W 4/02; H04W 40/02; H04W 4/12
See application file for complete search history.

(56) References Cited

U.S. PATENT DOCUMENTS

| | | | |
|---|---|---|---|
| 2004/0072554 A1* | 4/2004 | Henderson | H03G 3/3042 455/341 |
| 2007/0201437 A1* | 8/2007 | Kim | H04B 7/061 370/352 |
| 2011/0013092 A1* | 1/2011 | Chung | H04W 16/06 348/732 |

(Continued)

FOREIGN PATENT DOCUMENTS

| | | |
|---|---|---|
| KR | 10-2015-0110426 A | 10/2015 |
| WO | 2015047167 A1 | 4/2015 |

*Primary Examiner* — Jinsong Hu
*Assistant Examiner* — Farideh Madani
(74) *Attorney, Agent, or Firm* — Jefferson IP Law, LLP

(57) ABSTRACT

A 5th generation (5G) or pre-5G communication system for supporting a higher data transfer rate than a 4th generation (4G) communication system such as long term evolution (LTE) is provided. An electronic device may include a processor and a communication interface operatively coupled to the processor for transmitting and receiving a message. The processor can transmit a first message to a first electronic device using a proximity communication for communication with a second electronic device, and the first message can include information enabling the first electronic device to communicate with the second electronic device on behalf of the electronic device.

16 Claims, 27 Drawing Sheets

(56) References Cited

U.S. PATENT DOCUMENTS

| | | | |
|---|---|---|---|
| 2014/0140241 A1* | 5/2014 | Ljung | H04W 12/02 370/254 |
| 2014/0247802 A1* | 9/2014 | Wijting | H04W 72/0453 370/329 |
| 2015/0029866 A1* | 1/2015 | Liao | H04W 4/023 370/241 |
| 2015/0145653 A1 | 5/2015 | Katingari et al. | |
| 2015/0156757 A1* | 6/2015 | Kalhan | H04L 1/1607 370/330 |
| 2015/0215833 A1 | 7/2015 | Siomina et al. | |
| 2016/0105759 A1* | 4/2016 | Wang | H04W 4/008 455/41.2 |
| 2016/0128123 A1* | 5/2016 | Li | H04W 72/08 370/252 |
| 2016/0381727 A1* | 12/2016 | Dwarakanath | H04W 4/21 455/41.2 |
| 2017/0238103 A1* | 8/2017 | Gehring | H04R 25/552 381/23.1 |
| 2017/0318546 A1* | 11/2017 | Suzuki | H04W 52/34 |
| 2018/0220308 A1* | 8/2018 | Miao | H04W 16/28 |

\* cited by examiner

APPARATUS AND METHOD FOR CONTROLLING TRANSMISSION AND RECEPTION IN A WIRELESS COMMUNICATION SYSTEM

CROSS-REFERENCE TO RELATED APPLICATION(S)

This application claims the benefit under 35 U.S.C. § 119(a) of a Korean patent application filed on Dec. 2, 2015 in the Korean Intellectual Property Office and assigned Serial No. 10-2015-0170432, the entire disclosure of which is hereby incorporated by reference.

TECHNICAL FIELD

The present disclosure relates generally to transmission and reception control of an electronic device using another device.

BACKGROUND

To satisfy the demand for increased wireless data traffic, which has grown after commercialization of the $4^{th}$ generation (4G) communication system, efforts are exerted to develop an advanced $5^{th}$ generation (5G) communication system or a pre-5G communication system. The 5G communication system or the pre-5G communication system is referred to as a beyond 4G network communication system or a post long term evolution (LTE) system.

To achieve a high data transfer rate, the 5G communication system considers its realization in an extremely high frequency (mmWave) band (e.g., 60 GHz band). To mitigate a path loss of propagation in the extremely high frequency band and to extend a propagation distance, beamforming, massive multiple input multiple output (MIMO), full dimensional (FD)-MIMO, an array antenna, analog beamforming, and a large scale antenna are discussed in the 5G communication system.

To improve a system network, the 5G communication system is developing an evolved small cell, an advanced small cell, a cloud radio access network (RAN), an ultra-dense network, a device to device (D2D) communication, a wireless backhaul, a moving network, cooperative communication, coordinated multi-points (CoMP), and interference cancellation.

Besides, the 5G system is developing hybrid frequency shift keying (FSK) and quadrature amplitude modulation (QAM) modulation (FQAM) and sliding window superposition coding (SWSC) as advanced coding modulation (ACM), and filter bank multi carrier (FBMC), non-orthogonal multiple access (NOMA), and sparse code multiple access (SCMA) as advanced access technologies.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and at least the advantages described below. Accordingly, an aspect of the present disclosure is to provide an apparatus and a method for controlling transmission and reception using another device.

In accordance with an aspect of the present disclosure, a method for operating an electronic device in a wireless environment is provided. The method includes transmitting, to a first electronic device, a first message via a proximity communication path, for communicating with a second electronic device, wherein the first message comprises first information by which the first electronic device is identified to the second electronic device as the electronic device and second information by which the first electronic device, which is identified to the second electronic device as the electronic device, communicates with the second electronic device.

In accordance with another aspect of the present disclosure, a method for operating an electronic device in a wireless environment is provided. The method includes receiving, from a first electronic device, a first message via a proximity communication path, and communicating with a second electronic device as the first electronic device, based on the received first message, wherein the first message comprises an identifier of the first electronic device and control data for communicating with the second electronic device.

In accordance with another aspect of the present disclosure, an electronic device in a wireless environment is provided. The electronic device includes a processor, and a communication interface operatively coupled to the processor, wherein the processor is configured to transmit, to a first electronic device, a first message via a proximity communication path, for communicating with a second electronic device, and wherein the first message comprises first information by which the first electronic device is identified to the second electronic device as the electronic device and second information by which the first electronic device, which is identified to the second electronic device as the electronic device, communicates with the second electronic device.

In accordance with another aspect of the present disclosure, an electronic device in a wireless environment is provided. The electronic device includes a processor, and a communication interface operatively coupled to the processor, wherein the processor is configured to receive, from a first electronic device, a first message via a proximity communication path, and communicate with a second electronic device as the first electronic device, based on the received first message, and wherein the first message comprises an identifier of the first electronic device and control data for communicating with the second electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components and structures.

DETAILED DESCRIPTION

Figure 1:
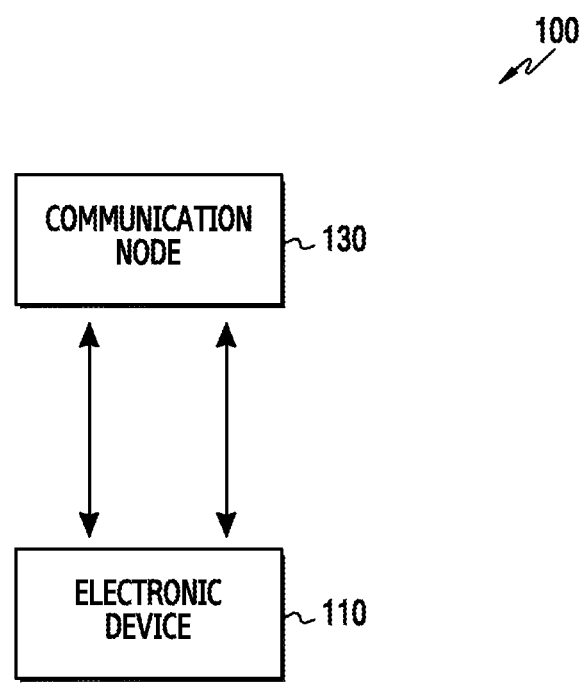
FIG. 1 is a diagram of a network between an electronic device and a communication node according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terminology used herein is for the purpose of describing embodiments only and is not intended to be limiting. As used herein, the singular forms are intended to include plural forms as well, unless the context clearly indicates otherwise. The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology. As long as the terms are not defined obviously, they are not ideally or excessively analyzed as formal meanings. In some cases, terms used in the specification cannot be construed as being limited to the terms.

In embodiments of the present disclosure described below, a hardware approach will be described as an example. However, since the embodiments of the present disclosure include a technology using both hardware and software, the present disclosure does not exclude a software-based approach.

Embodiments of the present disclosure provide an apparatus and a method for controlling transmission and reception in a wireless communication system.

In the following explanation, terms indicating control information, terms indicating network entities, terms indicating messages, and terms indicating components of a device are for the sake of explanations. Accordingly, the present disclosure is not limited to the terms to be described, and can use other terms indicating objects having technically identical meaning.

To ease the understanding, some terms and names defined in the 3$^{rd}$ generation partnership project (3GPP) long term evolution (LTE) standard can be used. However, the present disclosure is not limited to those terms and names, and can be equally applied to a system conforming to other standards.

The number of electronic devices such as smartphones, tablets, smartwatches, wearable devices is exponentially increasing. Such electronic devices can have at least one of cellular capability such as $4^{th}$ generation (4G) based on LTE/worldwide interoperability for microwave access (WiMAX) or 3G based on universal mobile telecommunication system (UMTS)/code division multiple access (CDMA), and radio capability such as Bluetooth/Wi-Fi. Using one or more radio capabilities equipped on the electronic device, the electronic devices can access the Internet in order to use not only operator or service provider services but also various application programs such as audio/video streaming, navigation map, social networking application, game, and over the top (OTT) services.

Electronic device users can own a plurality of electronic devices thanks to technological development. The user can utilize the electronic devices in proximity. For example, a user having a smartphone and a smartwatch can use the smartphone while wearing the smartwatch on his/her wrist. The electronic devices can be used independently for a specific service. For example, when the smartwatch is used for a voice service or a short message service (SMS), the smartphone can be used for a data service. Also, the electronic devices can be used for a specific service using a particular radio access technology (RAT). For example, when the smartwatch uses a 3G RAT for the voice service or the SMS, the smartphone can use an LTE RAT for the data service.

The electronic devices can have capability limitations in a radio frequency (RF) chain, an antenna, and a baseband processing unit. An electronic device according to various embodiments can enhance the capabilities without hardware addition, by means of an electronic device which assists the electronic device.

For example, when conducting wide area network (WAN) communication, the electronic devices can perform device to device (D2D) discovery and D2D communication. The D2D discovery can be used to discover another device in proximity. The D2D discovery can indicate a sidelink direct discovery defined in 3GPP technical specification (TS) 36.331. The D2D communication can be used for groupcasting and unicasting between neighbor devices. The D2D communication can indicate sidelink direct communication defined in 3GPP TS 36.331. Due to limitations of the RF chain, the electronic devices may not perform the D2D discovery or the D2D communication during the WAN communication. An electronic device according to various embodiments can fulfill the WAN communication by means of an electronic device assisting the electronic device without RF chain addition, and concurrently fulfill the D2D discovery or D2D communication.

For example, the electronic devices can adopt carrier aggregation (CA) for signal transmission or reception. A standard for the CA allows aggregation of up to 32 carrier components (CCs). However, due to the RF chain limitation, the number of the CCs actually used by the electronic devices can be smaller than 32. The present electronic device can utilize the CA by aggregating more CCs without RF chain addition.

For example, the electronic devices can consume a battery for the signal transmission or reception. When the electronic devices are located on an edge of cell coverage, the battery can be consumed considerably. The present electronic device can transmit or receive a signal on the cell coverage edge with less power consumption by means of an electronic device assisting the electronic device without battery addition.

FIG. 1 depicts a network between an electronic device and a communication node according to an embodiment of the present disclosure.

Referring to FIG. 1, the network 100 can include an electronic device 110 and a communication node 130.

The electronic device 110 can perform WAN communication or proximity communication with the communication node 130. The communication method can vary according to a type of the communication node 130. The electronic device 110 can include an arbitrary mobile system such as a mobile phone, a smartphone, a music player, a portable game console, a navigation system, a laptop computer, a user equipment (UE), and a mobile station. For example, the electronic device 110 can include a smartphone or a tablet.

The communication node 130 can perform the WAN communication with other electronic devices. The communication node 130 can perform the proximity communication with other electronic devices. The communication node 130 can include an arbitrary device such as a mobile phone, a smartphone, a music player, a portable game console, a navigation system, a laptop computer, a UE, a mobile station, a base station, and an evolved NodeB (eNB). The communication node 130 may be referred to as a second electronic device 130.

The electronic device 110 can transmit a signal to the communication node 130 using the WAN communication. The electronic device 110 can receive a signal from the communication node 130 using the WAN communication. The WAN communication, which is cellular communication, can conform to, for example, LTE, WiMAX, or UMTS and adopt a multiple access method such as CDMA, wideband CDMA (WCDMA), filter bank multi carrier (FBMC), non-orthogonal multiple access (NOMA), and sparse code multiple access (SCMA).

The electronic device 110 can communicate with the communication node 130. The electronic device 110 can transmit or receive a signal to or from the communication node 130 using a limited RF chain. For example, with a single RF chain between the electronic device 110 and the communication node 130, due to the limited RF chain, the electronic device 110 can transmit a signal to the communication node 130 and receive a signal from the communication node 130 by dividing time. For example, the electronic device 110 and the communication node 130 can communicate with each other using the CA. With a single RF chain between the electronic device 110 and the communication node 130, the electronic device 110 can communicate with the communication node 130 by time-dividing each frequency band (e.g., CC) and hopping the frequency. The electronic device 110 alone may generate data required for the communication (e.g., process communication) with the communication node 130.

Figure 2A:
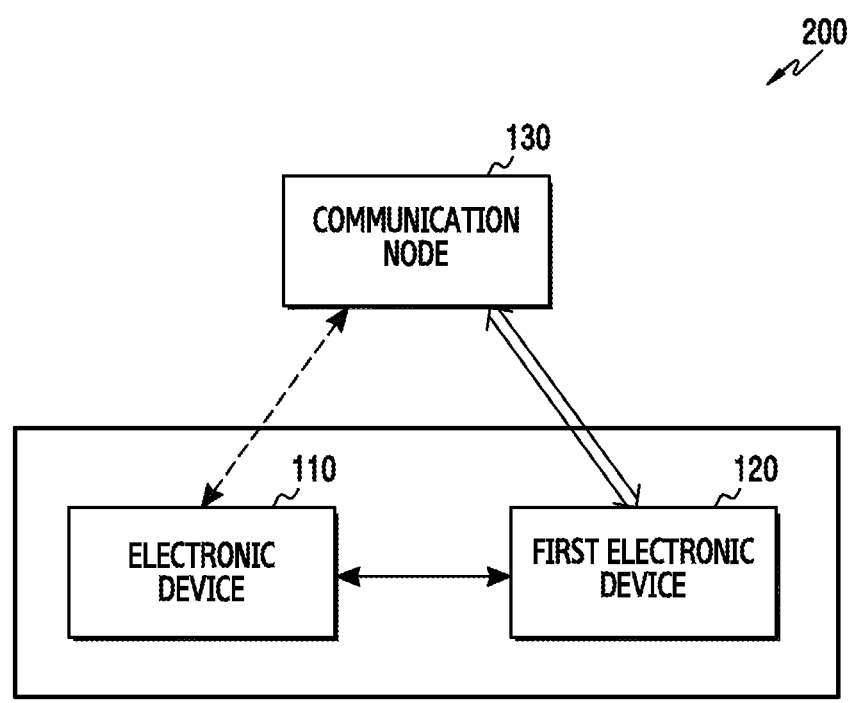
FIG. 2A is a diagram of a network according to an embodiment of the present disclosure.

FIG. 2A depicts a network according to an embodiment of the present disclosure.

Referring to FIG. 2A, the network 200 can include the electronic device 110, a first electronic device 120, and the communication node 130.

The electronic device 110 can perform WAN communication or proximity communication with the communication node 130. The communication method can vary according to the communication node 130. The electronic device 110 can perform the proximity communication with the first electronic device 120. The electronic device 110 can utilize the first electronic device 120 to expand its capability.

The first electronic device 120 can perform the WAN communication or the proximity communication with the communication node 130. The first electronic device 120 can perform the proximity communication with the electronic device 110. To expand the capability of the electronic device 110, the first electronic device 120 can assist the electronic device 110. The first electronic device 120 can be transparent to the communication node 130.

The first electronic device 120 can include an arbitrary mobile system such as a mobile phone, a smartphone, a music player, a portable game console, a navigation system, a laptop computer, a UE, and a mobile station. For example, the first electronic device 120 can include a smartwatch or a wearable device. The first electronic device 120 may include a set of electronic devices.

The communication node 130 can perform the WAN communication with other electronic devices. The communication node 130 can perform the proximity communication with other electronic devices. The communication node 130 can include an arbitrary device such as a mobile phone, a smartphone, a music player, a portable game console, a navigation system, a laptop computer, a UE, a mobile station, a base station, and an eNB.

The electronic device 110 can transmit a signal to the first electronic device 120 using the proximity communication. The electronic device 110 can receive a signal from the first electronic device 120 using the proximity communication. The proximity communication can include Bluetooth, Bluetooth low energy (BLE), Wi-Fi direct, and sidelink direct (hereafter, referred to as D2D) of LTE.

The electronic device 110 can transmit a signal to the communication node 130 using the WAN communication. The electronic device 110 can receive a signal from the communication node 130 using the WAN communication. The WAN communication, which is cellular communication, can conform to, for example, LTE, WiMAX, or UMTS and adopt a multiple access method such as CDMA, WCDMA, FBMC, NOMA, and SCMA.

To assist the electronic device 110, the first electronic device 120 can transmit a signal to the communication node 130 using the proximity communication. To assist the electronic device 110, the first electronic device 120 can receive a signal from the communication node 130 using the proximity communication. The proximity communication can include Bluetooth, BLE, Wi-Fi direct, and LTE D2D.

To assist the electronic device 110, the first electronic device 120 can transmit a signal to the communication node 130 using the WAN communication. To assist the electronic device 110, the first electronic device 120 can receive a signal from the communication node 130 using the WAN communication. The WAN communication can include LTE, WiMAX, UMTS, CDMA, WCDMA, FBMC, NOMA, and SCMA.

The electronic device 110 can communicate with the communication node 130. To achieve communication capacity, power control, and a better communication path, the electronic device 110 can communicate with the communication node 130 with the aid of the first electronic device 120. That is, the electronic device 110 can communicate with the communication node 130 using its own communication capability and the capability of the first electronic device 120. The communication node 130 may not recognize the first electronic device 120 assisting the electronic device 110. The communication node 130, which communicates with the first electronic device 120, can recognize that it communicates with the electronic device 110. In other words, the first electronic device 120 can be transparent to the communication node 130.

TABLE 1

| Example scenario | Application layer on the electronic device | first electronic device |
| --- | --- | --- |
| enhanced CA | RF + BB + L2 + L3 processing on one or more carriers | 1. Processing on additional carriers (1) RF (option 1) (2) RF + BB (option 2) (3) RF + BB + L2 (option 3) |
| Concurrent services | One or more data radio bearers | Additional data radio bearers (e.g. data services) |
| Low power handling | WAN RX | WAN TX |

Table 1 shows various applications in the network 200.

When the communication node 130 is a base station and the electronic device 110 is a mobile station, the electronic device 110 can conduct the WAN communication with the communication node 130. The electronic device 110 can authorize part of operations generating during the communication with the communication node 130, to the first electronic device 120 (e.g., a smartwatch). For example, the operation authorized to the first electronic device 120 can transmit or receive a signal to or from the communication node 130 using a different frequency. The first electronic device 120 can perform an operation based on a request of the electronic device 110. For example, the first electronic device 120 can forward an RF signal from the communication node 130 to the electronic device 110. For example, the first electronic device 120 can baseband-process an RF signal from the communication node 130 and send the processed RF signal to the electronic device 110. For example, the first electronic device 120 can baseband-process and decode in L2 layer an RF signal from the communication node 130 and then send the decoded RF signal to the electronic device 110.

In some embodiments, the first electronic device 120 can perform the authorized operation using a communication parameter received from the electronic device 110 without establishing a connection with the communication node 130 according to a communication protocol. When the communication node 130 transmits a signal to the electronic device 110, the first electronic device 120 authorized to receive a signal can overhear corresponding data using the parameter received from the electronic device 110. When the first electronic device 120 is authorized with the transmission from the electronic device 110, the first electronic device 120 can forward data to the communication node 130 on behalf of the electronic device 110.

In some other embodiments, the electronic device 110 can authorize not only the communication operation but also part of its task to the first electronic device 120. For example, the electronic device 110 can receive voice data or a bearer of the voice data and authorize the first electronic device 120 to receive other data or data bearers to the first electronic device 120.

In some other embodiments, when meeting a designated condition, the electronic device 110 can directly process the signal reception and authorize the signal transmission to the first electronic device 120.

When the electronic device 110 and the communication node 130 are mobile stations, the electronic device 110 and the communication node 130 can transmit or receive an LTE-D2D signal. The electronic device 110 (e.g., a mobile station) can authorize the first electronic device 120 (e.g., a smartwatch) to conduct part of the communication operation with the communication node 130 (e.g., another mobile station). For example, the operation authorized to the first electronic device 120 can include LTE-D2D signal transmission or reception in the same frequency or another frequency. The first electronic device 120 can perform the authorized operation using a communication parameter received from the electronic device 110. For example, when the electronic device 110 authorizes LTE-D2D discovery signal transmission or reception to the first electronic device 120 in order to reduce power consumption, the first electronic device 120 can transmit or receive an intended discovery code of the electronic device 110. For example, when the LTE-D2D communication is authorized to the first electronic device 120, the first electronic device 120 can transmit or receive data on behalf of the electronic device 110.

Figure 2B:
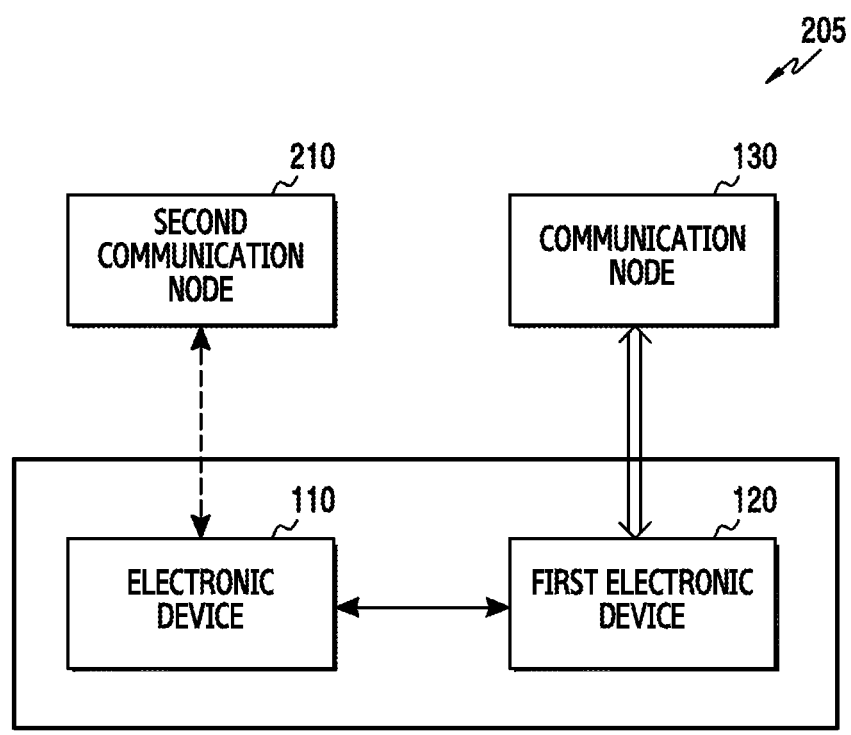
FIG. 2B is a diagram of a network according to an embodiment of the present disclosure.

FIG. 2B depicts a network according to an embodiment of the present disclosure.

Referring to FIG. 2B, the network 205 can include the electronic device 110, the first electronic device 120, the communication node 130, and a second communication node 210.

The second communication node 210 can perform WAN communication with other electronic devices. The second communication node 210 can perform proximity communication with other electronic devices. The second communication node 210 can include a UE, a mobile station, a base station, and an eNB. The second communication node 210 may be referred to as a third electronic device 210.

The second communication node 210 can transmit a signal to the electronic device 110 using the proximity communication. The second communication node 210 can receive a signal from the electronic device 110 using the proximity communication. The proximity communication can include Bluetooth, BLE, Wi-Fi direct, and D2D of LTE.

The second communication node 210 can transmit a signal to the electronic device 110 using the WAN communication. The second communication node 210 can receive a signal from the electronic device 110 using the WAN communication. The WAN communication can include LTE, WiMAX, UMTS, CDMA, WCDMA, FBMC, NOMA, and SCMA.

The electronic device 110 can communicate with the second communication node 210. Also, the electronic device 110 can communicate with the communication node 130. The communication with the communication node 130 and the communication with the second communication node 210 can be conducted using different communication methods or the same communication method. When communicating with the communication node 130 and the second communication node 210 at the same time, the electronic device 110 can operate with the limited performance due to overload. For example, the electronic device 110 can communicate with the communication node 130 and the second communication node 210 using fewer resources due to the limited resources. For example, the communication with the communication node 130 and the second communication node 210 can abruptly increase the power consumption of the electronic device 110. For example, when communicating with the communication node 130 and the second communication node 210 using the same communication method, the electronic device 110 may not transmit signals to both of the communication node 130 and the second communication node 210 due to hardware (e.g., antenna) limitations. The electronic device 110 can communicate with the communication node 130 with the aid of the first electronic device 120. That is, the electronic device 110 can communicate with the communication node 130 using its own communication capability, and communicate with the second communication node 210 using the capability of the first electronic device 120. The first electronic device 120 assisting the electronic device 110 may not be recognized by the communication node 130. Although communicating with the first electronic device 120, the communication node 130 can recognize that it communicates with the electronic device 110.

TABLE 2

| Example scenario | Application layer on the electronic device | First electronic device |
|---|---|---|
| WAN-D2D operation | WAN operation | D2D Rx |
|  | WAN operation | D2D Tx |
|  | WAN operation | D2D Tx/Rx |
|  | WAN operation - D2D Rx | D2D Tx |
|  | WAN operation - D2D Tx | D2D Rx |
| Tx/Rx from multiple eNBs | eNB #1 | eNB #2 |

Table 2 shows various applications in the network 205.

When the communication node 130 is a base station, the second communication node 210 is a mobile station, and the electronic device 110 is a mobile station, the electronic device 110 can conduct the WAN communication with the communication node 130 and transmit and receive signals to and from the second communication node 210. While transmitting or receiving data to or from the communication node 130, the electronic device 110 can transmit or receive a D2D signal to or from an external source. The electronic device 110 can authorize part of operations with the communication node 130 to the first electronic device 120 (e.g., a smartwatch). The authorized operation can transmit or receive a D2D discovery message or a D2D communication message. In some embodiments, the electronic device 110 can transmit or receive data to or from the second communication node 210, perform either the D2D transmission or reception with the communication node 130, and authorize the remaining D2D operation to the first electronic device 120. The first electronic device 120 with the authorized operation can execute the authorized operation using a communication parameter received from the electronic device 110 without separate D2D establishment. For example, when the reception of the D2D discovery message or the D2D communication message is authorized to the first electronic device 120, the first electronic device 120 can receive D2D discovery messages or D2D communication messages from proximity during a preset time (or at preset intervals). For example, when the transmission of the D2D discovery message or the D2D communication message is authorized to the first electronic device 120, the first electronic device 120 can transmit the D2D discovery message or the D2D communication message during a preset time (or at preset intervals) using a resource allocated from the second communication node 210 to the electronic device 110. The first electronic device 120 can be transparent to the communication node 130 or the second communication node 210.

When the communication node 130 and the second communication node 210 are base stations and the electronic device 110 is a mobile station, the electronic device 110 can perform the WAN communication with both of the communication node 130 and the second communication node 210. For example, the WAN communication can be dual connectivity. The electronic device 110 can receive data from the communication node 130 and the second communication node 210 in different frequencies, or transmit data to the communication node 130 and the second communication node 210 in different frequencies. The electronic device 110 can authorize part of operations relating to the communication node 130, to the first electronic device 120 (e.g., a smartwatch). For example, the authorized operation can transmit or receive data. The first electronic device 120 can execute the authorized operation using the communication parameter received from the electronic device 110 without establishing a connection according to the communication protocol of the communication node 130. For example, when the communication node 130 transmits a signal to the electronic device 110, the first electronic device 120 authorized to receive a signal can overhear the signal from the communication node 130 using the parameter received at a resource from the electronic device 110. For example, when the electronic device 110 transmits a signal to the communication node 130, the first electronic device 120 authorized to transmit a signal can forward the signal to the communication node 130 using a resource allocated from the communication node 130 to the electronic device 110, on behalf of the electronic device 110.

Figure 2C:
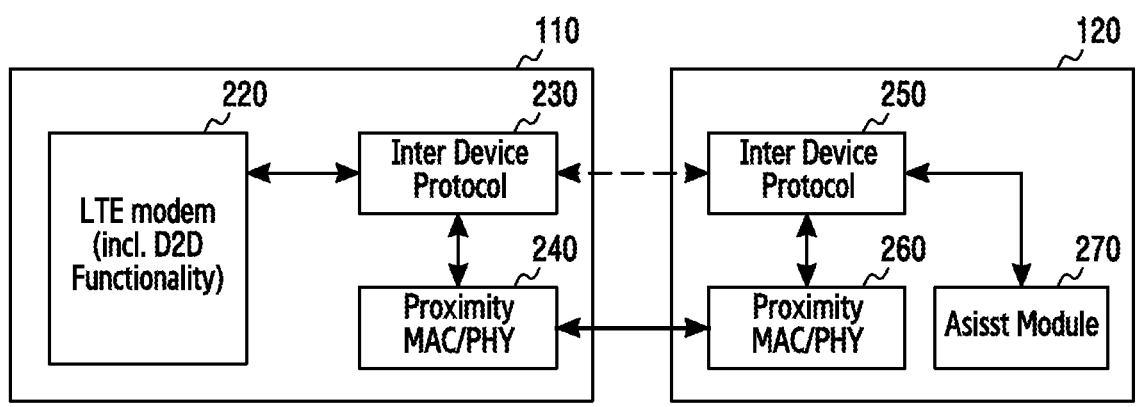
FIG. 2C is a functional block diagram of a protocol according to an embodiment of the present disclosure.

FIG. 2C is a functional block diagram of a protocol according to an embodiment of the present disclosure, which can be applied to the electronic device 110 and the first electronic device 120.

Referring to FIG. 2C, the electronic device 110 can include an LTE modem 220, an inter device protocol 230, and a proximity media access control (MAC)/physical (PHY) 240.

The LTE modem 220 can perform the WAN communication. The LTE modem 220 can include a protocol stack (e.g., MAC, PHY) for supporting broadband communication. The LTE modem 220 can perform the D2D communication or discovery. For example, the LTE modem 220 can communicate with a base station. For example, the LTE modem 220 can conduct the LTE-D2D communication or the LTE-D2D discovery with another electronic device.

The inter device protocol 230 can perform an operation relating to a resource (e.g., an RF resource) required by the electronic device 110. For example, the inter device protocol 230 can determine whether the electronic device 110 requires more resources. The inter device protocol 230 can perform an operation (e.g., signal transmission or reception) required by the electronic device 110. For example, the inter device protocol 230 can confirm an operation of the electronic device 110 requested from a higher layer and carry out the confirmed operation. For example, the inter device protocol 230 can receive capability (e.g., a radio resource state, a power consumption state, or a battery level) of the LTE modem 220 from the LTE modem 220. Based on the received capability of the LTE modem 220, the inter device protocol 230 can determine operations to request from the first electronic device 120. Based on the determined operations, the inter device protocol 230 can generate a message to transmit to the first electronic device 120. The inter device protocol 230 can send the generated message to the proximity MAC/PHY 240. For example, when the electronic device 110 wants to receive an RF signal over a different frequency, the inter device protocol 230 can generate a message including the intended RF signal to receive. The inter device protocol 230 can send the generated message to the proximity MAC/PHY 240. The proximity MAC/PHY 240 can be a MAC/PHY layer for the proximity communication. For example, the proximity MAC/PHY 240 can conduct the proximity communication using a different technology (e.g., Wi-Fi, Bluetooth) from the LTE modem 220. For example, the proximity MAC/PHY 240 may conduct the proximity communication using the same technology (e.g., LTE-D2D) as the LTE modem 220. The proximity MAC/PHY 240 can be functionally independent from the LTE modem 220. The proximity MAC/PHY 240 can transmit the message from the inter device protocol 230 to the first electronic device 120.

The first electronic device 120 can include an inter device protocol 250, a proximity MAC/PHY 260, and an assist module 270.

The proximity MAC/PHY 260 can be a MAC/PHY layer for the proximity communication. For example, the proximity MAC/PHY 260 can conduct the proximity communication using a different technology (e.g., Wi-Fi, Bluetooth) from the LTE modem 220. For example, the proximity MAC/PHY 260 may conduct the proximity communication using the same technology (e.g., LTE-D2D) as the LTE modem 220. The proximity MAC/PHY 260 can forward a message received from the electronic device 110 through the proximity MAC/PHY 240, to the inter device protocol 250. The proximity MAC/PHY 260 may transmit a report message (e.g., a message for an operation requested by the electronic device 110) to the electronic device 110 through the proximity MAC/PHY 240.

The inter device protocol 250 can receive a request of the electronic device 110 using the message from the proximity MAC/PHY 260. The inter device protocol 250 can command the operation according to the received request of the electronic device 110, to the first electronic device 120 or the component (e.g., the assist module 270) of the first electronic device 120. The inter device protocol 250 can provide its command result to the electronic device 110. In other words, the inter device protocol 250 can logically (or operatively) communicate with the inter device protocol 230 of the electronic device 110.

The assist module 270 can receive all or part of the request of the electronic device 110 from the inter device protocol 250. The assist module 270 can perform various operations based on the received request.

The assist module 270 can include various devices according to the capability of the first electronic device 120. The assist module 270 can include functions and/or devices for fulfilling the operations of Table 1 and Table 2. For example, when the electronic device 110 requests RF signal reception, the assist module 270 can include a receiving device. The assist module 270 can receive the RF signal based on the request. For example, when the electronic device 110 requests to receive an RF signal and to process the received RF signal (e.g., to filter the received RF signal), the assist module 270 can include a receiving device and a control device. The assist module 270 can receive an RF signal based on the request and process (or control) the received RF signal.

The assist module 270 can send a request result of the electronic device 110 to the inter device protocol 250.

The inter device protocol 250 can generate a report message based on the result received from the assist module 270. The inter device protocol 250 can send the generated report message to the proximity MAC/PHY 260.

The proximity MAC/PHY 260 can transmit the report message to the electronic device 110 through the proximity MAC/PHY 240.

The proximity MAC/PHY 240 can forward the received report message to the inter device protocol 230. The inter device protocol 230 can forward the received report message to a higher layer or the LTE modem 220.

Figure 3:
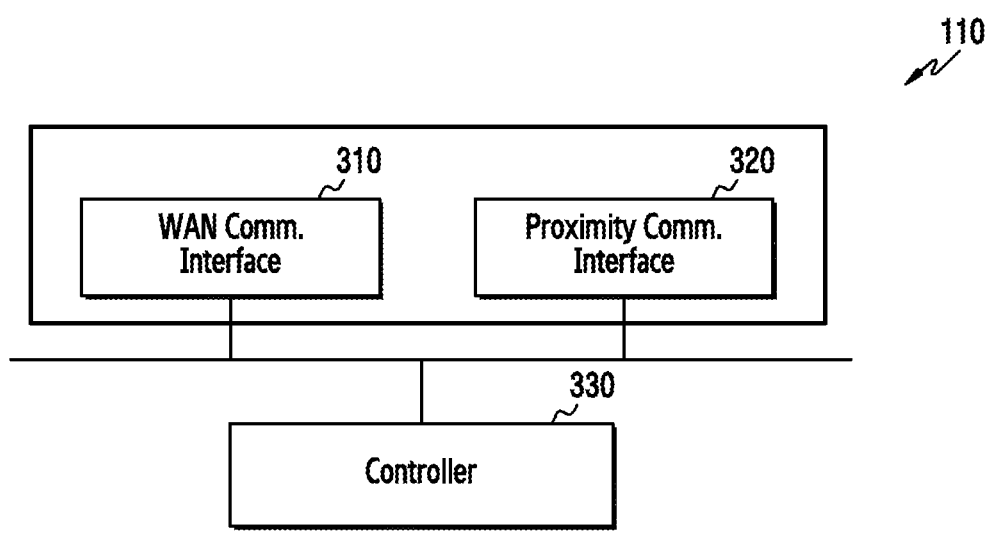
FIG. 3 is a functional block diagram of an electronic device according to an embodiment of the present disclosure.

FIG. 3 is a functional block diagram of an electronic device according to an embodiment of the present disclosure, which can be included in the electronic device 110 of FIG. 1.

Referring to FIG. 3, the electronic device 110 can include a WAN communication interface 310, a proximity communication interface 320, and a controller (e.g., processor) 330.

The WAN communication interface 310 can establish the WAN communication between the electronic device 110 and an external device. For example, to execute or control an application, the WAN communication interface 310 can communicate with an external device over a network using the WAN communication. For example, the WAN communication interface 310 can communicate with other electronic devices (e.g., the communication node 130 of FIG. 1 and the second communication node 210 of FIG. 2) using LTE, WiMAX, UMTS, CDMA, WCDMA, FBMC, NOMA, or SCMA.

The WAN communication interface 310 can include a plurality of antennas. The WAN communication interface 310 can include a transmitter and/or a receiver. The WAN communication interface 310 can include a source encoder, a channel encoder, a modulator, and so on. The WAN communication interface 310 can include a source decoder, a channel decoder, a demodulator, and so on.

The proximity communication interface 320 can establish the proximity communication between the electronic device 110 and an external device. For example, to execute or control an application, the proximity communication interface 320 can communicate with the external device using the proximity communication. For example, the proximity communication interface 320 can communicate with other electronic devices (e.g., the first electronic device 120 and the communication node 130 of FIG. 1) using Bluetooth, BLE, Wi-Fi direct, or LTE D2D.

The proximity communication interface 320 can send an indication message to the first electronic device 120 so that the first electronic device 120 assists in the communication of the electronic device 110 and the communication node 130.

The proximity communication interface 320 can include a transmitter and/or a receiver. The proximity communication interface 320 can include a source encoder, a channel encoder, a modulator, and so on. The proximity communication interface 320 can include a source decoder, a channel decoder, a demodulator, and so on.

According to various embodiments, the WAN communication interface 310 and the proximity communication interface 320 may be embodied as a single communication interface.

The controller 330 can control the operations of the electronic device 110. The controller 330 can execute applications for an Internet browser, a game, a video, and the like. The controller 330 can include a single processor core or a plurality of processor cores. For example, the controller 330 can include a multi-core processor such as a dual-core processor, a quad-core processor, and a hexa-core processor. The controller 330 can further include a cache memory disposed inside or outside the controller 330. The controller 330 may be operatively coupled with the components (e.g. the WAN communication interface 310, the proximity communication interface 320) of the electronic device 110.

The controller 330 can receive commands of the other components of the electronic device 110, interpret the received command, and process calculation or data according to the interpreted command.

For the communication between the electronic device 110 and another electronic device (e.g., the communication node 130), the controller 330 can determine whether assistance of the first electronic device 120 is required. When requiring the assistance of the first electronic device 120, the controller 330 can generate an indication message enabling the first electronic device 120 to communicate with the other electronic device on behalf of the electronic device 110.

The controller 330 can control the WAN communication interface 310 or the proximity communication interface 320 to transmit the indication message to the first electronic device 120.

Figure 4:
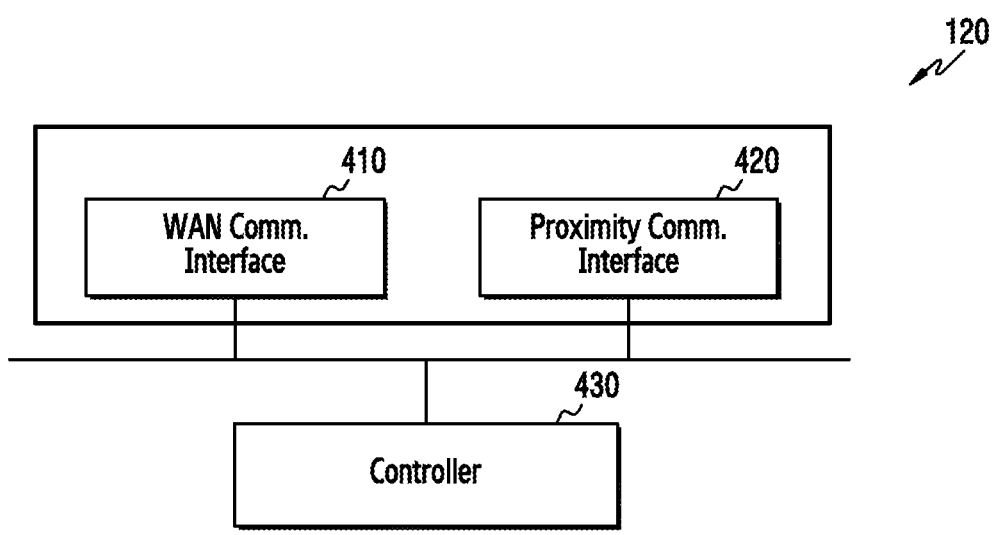
FIG. 4 is a functional block diagram of an electronic device according to an embodiment of the present disclosure.

FIG. 4 is a functional block diagram of an electronic device according to an embodiment of the present disclosure, which can be included in the first electronic device 120 of FIG. 1.

Referring to FIG. 4, the first electronic device 120 can include a WAN communication interface 410, a proximity communication interface 420, and a controller (e.g., processor) 430.

The WAN communication interface 410 can establish the communication between the first electronic device 120 and an external device. For example, to execute or control an application, the WAN communication interface 410 can communicate with the external device over a network using the WAN communication. For example, the WAN communication interface 410 can communicate with other electronic devices (e.g., the electronic device 110 and the communication node 130 of FIG. 1) using LTE, WiMAX, UMTS, CDMA, WCDMA, FBMC, NOMA, or SCMA.

When the first electronic device 120 receives the indication message for assisting the electronic device 110 from the electronic device 110, the WAN communication interface 410 can transmit or receive a signal or data corresponding to the indication message to or from the communication node 130. The signal or data corresponding to the indication message is a signal or data based on the electronic device 110 and can be recognized by the communication node 130.

The WAN communication interface 410 can include a plurality of antennas. The WAN communication interface 410 can include a transmitter and/or a receiver. The WAN communication interface 410 can include a source encoder, a channel encoder, a modulator, and so on. The WAN communication interface 410 can include a source decoder, a channel decoder, a demodulator, and so on.

The proximity communication interface 420 can establish the proximity communication between the first electronic device 120 and an external device. For example, to execute or control an application, the proximity communication interface 420 can communicate with the external device using the proximity communication. For example, the proximity communication interface 420 can communicate with other electronic devices (e.g., the electronic device 110 and the communication node 130) using Bluetooth, BLE, Wi-Fi direct, or LTE D2D.

The proximity communication interface 420 can receive from the electronic device 110 the indication message enabling the first electronic device 120 to assist the communication of the electronic device 110 and the communication node 130.

When the first electronic device 120 receives the indication message for assisting the electronic device 110 from the electronic device 110, the proximity communication interface 420 can transmit or receive a signal or data corresponding to the indication message to or from the communication node 130. The signal or the data corresponding to the indication message is a signal or data based on the electronic device 110 and can be recognized by the communication node 130.

The proximity communication interface 420 can include a transmitter and/or a receiver. The proximity communication interface 420 can include a source encoder, a channel encoder, a modulator, and so on. The proximity communication interface 420 can include a source decoder, a channel decoder, a demodulator, and so on.

According to various embodiments, the WAN communication interface 410 and the proximity communication interface 420 may be embodied as a single communication interface.

The controller 430 can control the operations of the first electronic device 120. The controller 430 can execute applications for an Internet browser, a game, a video, and the like. The controller 430 can include a single processor core or a plurality of processor cores. For example, the controller 430 can include a multi-core processor such as a dual-core processor, a quad-core processor, and a hexa-core processor. The controller 430 can further include a cache memory disposed inside or outside the controller 430. The controller 430 can be operatively coupled with the components (e.g. the WAN communication interface 410, the proximity communication interface 420) of the first electronic device 120.

The controller 430 can receive commands of the other components of the first electronic device 120, interpret the received command, and process calculation or data according to the interpreted command.

To assist the communication between the electronic device 110 and another electronic device (e.g., the communication node 130), the controller 430 can control the WAN communication interface 410 or the proximity communication interface 420 to receive the generated indication message from the electronic device 110.

The controller 430 can interpret the received indication message. For example, the controller 430 can obtain control information by decoding the received indication message. The control information can include information enabling the first electronic device 120 to communicate with the communication node 130 on behalf of the electronic device 110. The control information can include signal or data information for the communication between the electronic device 110 and the communication node 130.

Based on the control information, the controller 430 can control the first electronic device 120 to communicate with the communication node 130 on behalf of the electronic device 110.

The controller 430 can generate a report message based on a signal or data received from the communication node 130. The received signal or data can include the signal or data received from the communication node 130. The received signal or data can be a signal or data for the electronic device 110. The report message can include all or part of the received signal or data. The controller 430 can generate the report message including the received signal or data without processing it. The controller 430 can generate the report message by processing the received signal or data for the electronic device 110.

The controller 430 can control the WAN communication interface 410 or the proximity communication interface 420 to transmit the report message to the electronic device 110.

Figure 5:
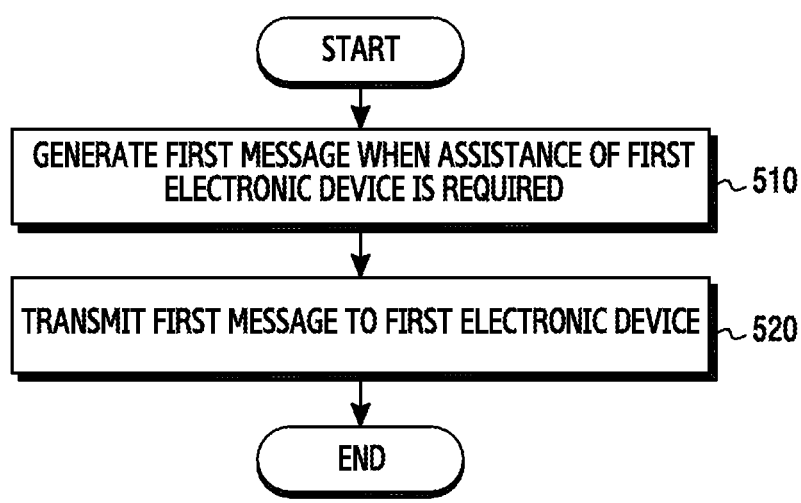
FIG. 5 is a flowchart of operations of an electronic device according to an embodiment of the present disclosure.

FIG. 5 is a flowchart of operations of an electronic device according to an embodiment of the present disclosure, which can be carried out by the electronic device 110 of FIG. 1.

Referring to FIG. 5, in operation 510, when requiring the assistance of the first electronic device 120, the electronic device 110 can generate a first message. The first message can include the indication message. The first message can include information enabling the first electronic device 120 of FIG. 1 to communication with the communication node 130 on behalf of the electronic device 110. For example, the first message can include an identifier (ID) so that the communication node 310 identifies the first electronic device 120 as the electronic device 110. The first message can include the signal or data for the electronic device 110 to transmit or receive to or from the communication node 130, or information of the signal or the data. For example, the signal or data or the information of the signal or data can include physical parameters such as resource information allocated to the electronic device 110 from the communication node 130 and modulation and coding scheme (MCS) level.

In operation 520, the electronic device 110 can transmit the first message to the first electronic device 120. For example, the electronic device 110 can transmit the first message to the first electronic device 120 for the communication with the communication node 130. The method for transmitting the first message to the first electronic device 120 may adopt the WAN communication or the proximity communication.

In the operations 510 and 520 of FIG. 5, the electronic device 110 can enhance its communication capability. For example, the electronic device 110 can obtain more resources (e.g., RF chain, CC) using the first electronic device 120. The electronic device 110 can operate as if it obtains more resources using the first electronic device 130. For example, the electronic device 110 can reduce the power consumption (e.g., battery consumption) using the first electronic device 120. The electronic device 110 can reduce the power consumption by replacing the WAN communication by the proximity communication with the first electronic device 120. For example, the electronic device 110 can obtain various communication paths (e.g., a Tx path, an Rx path) using the first electronic device 120.

Figure 6:
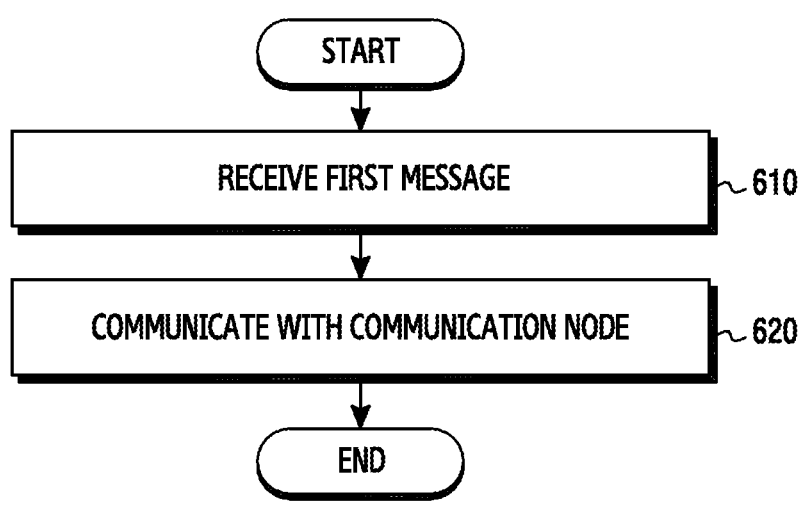
FIG. 6 is a flowchart of operations of an electronic device according to an embodiment of the present disclosure.

FIG. 6 is a flowchart of operations of an electronic device according to an embodiment of the present disclosure, which can be carried out by the first electronic device 120 of FIG. 1.

Referring to FIG. 6, in operation 610, the first electronic device 120 can receive a first message. The first message can be received from the electronic device 110. The first message can include information enabling the first electronic device 120 to communication with the communication node 130 of FIG. 1 on behalf of the electronic device 110. For example, the first message can include an ID enabling the first electronic device 120 to operate as the electronic device 110, and data or signal information to transmit or to receive from or at the electronic device 110. For example, the data or signal information to transmit or receive can include PHY parameters such as resource information allocated from the communication node 130 to the electronic device 110, and an MCS level. To communicate with the communication node 130 on behalf of the electronic device 110, the first electronic device 120 may generate a virtual ID. In this case, the first message may not include the ID of the electronic device 110.

In operation 620, the first electronic device 120 can communicate with the communication node 130. The communication of the first electronic device 120 and the communication node 130 can be performed based on the first message. The communication node 130 may not recognize the first electronic device 120. Although communicating with the first electronic device 120, the communication node 130 can recognize it as the communication with the electronic device 110. The communication node 130 can manage and maintain the communication connection (resource allocation, bearer, ID, etc.) with the electronic device 110 without building a separate connection with the first electronic device 120. Based on the information contained in the first message, the first electronic device 120 can receive or transmit a signal on behalf of the electronic device 110 and may not conduct a separate operation for the communication connection control.

In the operations 610 and 620 of FIG. 6, the first electronic device 120 can enhance the communication capability of the electronic device 110. For example, the first electronic device 120 can provide more resources (e.g., RF chain, CC) to the electronic device 110 by communicating with the communication node 130 on behalf of the electronic device 110. For example, the first electronic device 120 can assist the electronic device 110 in consuming less power by communicating with the communication node 130 on behalf of the electronic device 110. For example, the first electronic device 120 can provide various communication paths (e.g., a Tx path, an Rx path) by communicating with the communication node 130 on behalf of the electronic device 110.

Figure 7:
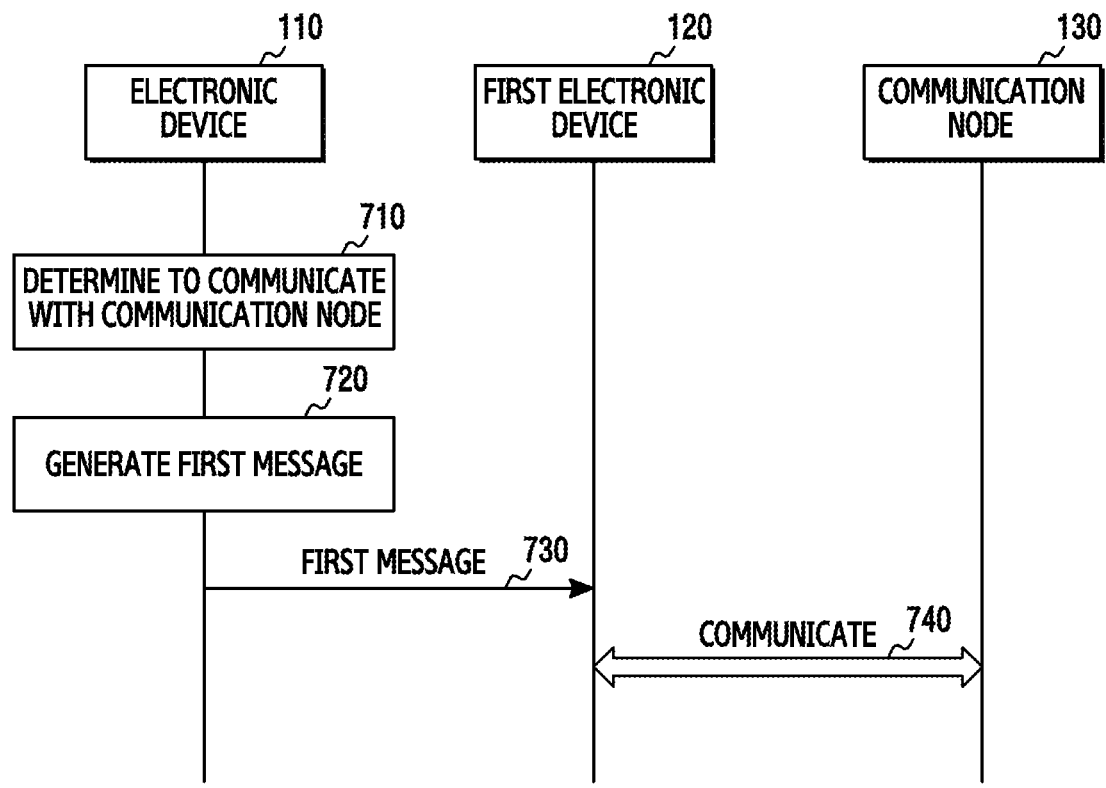
FIG. 7 is a signal flow diagram of electronic devices according to an embodiment of the present disclosure.

FIG. 7 is a signal flow diagram of electronic devices according to an embodiment of the present disclosure, which can be generated by the electronic device 110, the first electronic device 120, and the communication node 130 of FIG. 1.

Referring to FIG. 7, in operation 710, the electronic device 110 can determine to communicate with the communication node 130 of FIG. 1.

In operation 720, the electronic device 110 can generate a first message. The first message can be a message for obtaining the communication capability of the electronic device 110. The first message can be an indication message including information for controlling the first electronic device 120. The first message can include an indication requesting the first electronic device 120 to communicate with the communication node 130 and control information (e.g., ID, physical parameters such as resource information allocated from the communication node 130 to the electronic device 110 and MCS level) required to communicate with the communication node 130.

In operation 730, the electronic device 110 can transmit the first message to the first electronic device 120. Although not depicted in FIG. 7, the first electronic device 120 can process the received first message. For example, the first electronic device 120 can obtain the information from the first message by decoding the first message.

In operation 740, the first electronic device 120 can communicate with the communication node 130 on behalf of the electronic device 110 based on the first message. For example, the first electronic device 120 can transmit a signal or data corresponding to the first message to the communication node 130 on behalf of the electronic device 110. The first electronic device 120 can receive a signal or data corresponding to the first message from the communication node 130 on behalf of the electronic device 110. The first electronic device 120 can be transparent to the communication node 130. The communication node 130 can manage and maintain the communication connection (resource allocation, bearer, ID, etc.) with the electronic device 110 without setting a separate connection with the first electronic device 120. The first electronic device 120 can receive or transmit a signal on behalf of the electronic device 110 based on the information contained in the message, and may not perform a separate operation for the communication connection control.

Figure 8:
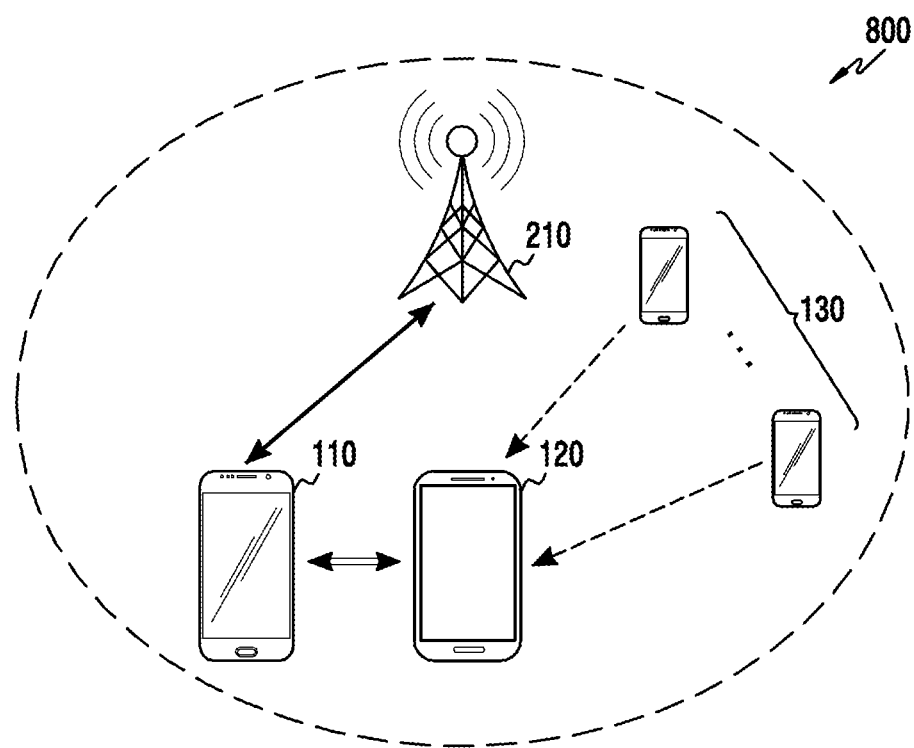
FIG. 8 is a diagram of a network covering both wide area network (WAN) communication and proximity communication according to an embodiment of the present disclosure.

FIG. 8 is a diagram of a network covering both WAN communication and proximity communication according to an embodiment of the present disclosure.

Referring to FIG. 8, the network 800 can include the electronic device 110, the first electronic device 120, and the communication node 130 of FIG. 1, and the second communication node 210 of FIG. 2. The communication node 130 may be referred to as the second electronic device 130. The second communication node 210 may be referred to as the third electronic device 210.

The electronic device 110, the first electronic device 120, and the communication node 130 can be UEs or mobile stations. The second communication node 210 can be an eNB or a base station.

The electronic device 110 can communicate with the communication node 130. The electronic device 110 can receive a D2D discovery signal from the communication node 130. The D2D discovery can be used to discovery another device in proximity.

The electronic device 110 can perform the WAN communication with the second communication node 210. For example, the electronic device 110 can communicate with the second communication node 210 using LTE.

The electronic device 110 and the first electronic device 120 can be located in proximity. For example, the electronic device 110 can be a smartphone, and the first electronic device 120 can be a smartwatch. The electronic device 110 can perform the proximity communication with the first electronic device 120. For example, the electronic device 110 can communicate with the first electronic device 120 using Bluetooth, BLE, Wi-Fi direct, or LTE D2D.

The first electronic device 120 can assist the electronic device 110 in relation to the communication node 130.

The first electronic device 120 and the communication node 130 can be located in proximity. The first electronic device 120 can receive a signal from the communication node 130 through the proximity communication. For example, the first electronic device 120 can receive a D2D discovery signal from the communication node 130.

The communication node 130 can be located near the electronic device 110 and the first electronic device 120. The communication node 130 can broadcast a D2D discovery signal. The communication node 130 can broadcast a D2D discovery signal including emergency information or disaster information. A plurality of the communication node 130 can be deployed.

The electronic device 110 may want to perform the WAN communication with the second communication node 210 using LTE and concurrently to receive an LTE D2D discovery signal from the communication node 130. The electronic device 110 may not receive a D2D discovery signal from the communication node 130 while communicating with the second communication node 210. This is because the D2D discovery signal and the WAN communication signal can share the same spectrum. For example, when the electronic device 110 communicates with the second communication node 210 and the communication node 130 broadcasts a D2D discovery signal including disaster information, the electronic device 110 cannot receive the D2D discovery signal including the disaster information.

To continuously receive the D2D discovery signal, the electronic device 110 can transmit an indication message (hereafter, referred to as a first message) to the first electronic device 120. The first message can be provided to the first electronic device 120 using the proximity communication. The first message can include information enabling the first electronic device 120 to receive the D2D discovery signal from the communication node 130 on behalf of the electronic device 110. The first electronic device 120 receiving the first message can receive the D2D discovery signal from the communication node 130 on behalf of the electronic device 110. The first electronic device 120 can provide information of the received D2D discovery signal to the electronic device 110 using the proximity communication.

By authorizing the first electronic device 120 to receive the D2D discovery signal, the electronic device 110 can communicate with the second communication node 210 and concurrently receive the D2D discovery signal from the communication node 130.

Figure 9:
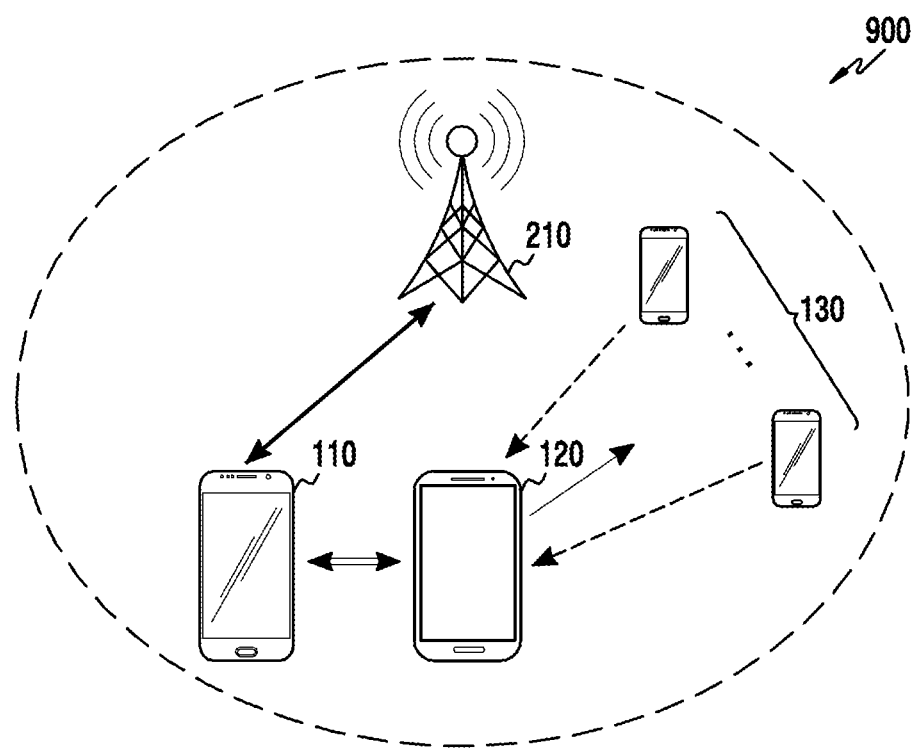
FIG. 9 is a diagram of a network covering both WAN communication and proximity communication according to an embodiment of the present disclosure.

FIG. 9 is a diagram of a network covering both WAN communication and proximity communication according to an embodiment of the present disclosure.

Referring to FIG. 9, the network 900 can include the electronic device 110, the first electronic device 120, and the communication node 130 of FIG. 1, and the second communication node 210 of FIG. 2.

The electronic device 110, the first electronic device 120, and the communication node 130 can be UEs or mobile stations. The second communication node 210 can be an eNB or a base station.

The electronic device 110 can communicate with the communication node 130. The electronic device 110 can transmit a D2D discovery signal to the communication node 130.

The electronic device 110 can perform the WAN communication with the second communication node 210. For example, the electronic device 110 can communicate with the second communication node 210 using LTE.

The electronic device 110 and the first electronic device 120 can be located in proximity. For example, the electronic device 110 can be a smartphone, and the first electronic device 120 can be a smartwatch. The electronic device 110 can perform the proximity communication with the first electronic device 120. For example, the electronic device 110 can communicate with the first electronic device 120 using Bluetooth, BLE, Wi-Fi direct, or LTE D2D.

The first electronic device 120 can assist the electronic device 110 in relation with the communication node 130.

The first electronic device 120 and the communication node 130 can be located in proximity. The first electronic device 120 can transmit a signal to the communication node 130 through the proximity communication. For example, the first electronic device 120 can transmit a D2D discovery signal to the communication node 130.

The communication node 130 can be located near the electronic device 110 and the first electronic device 120. The communication node 130 can receive D2D discovery signals from other devices. The D2D discovery signal can include emergency information or disaster information. A plurality of the communication node 130 can be deployed.

The electronic device 110 can be an electronic device of a user in an emergency. To notify the user's emergency, the electronic device 110 can perform LTE WAN communication with the second communication node 210 and transmit a D2D discovery signal to the communication node 130. While communicating with the second communication node 210, the electronic device 110 may not transmit the D2D discovery signal to the communication node 130. This is because the D2D discovery signal and the WAN communication signal can share the same spectrum. For example, while communicating with the second communication node 210, the electronic device 110 may not transmit the D2D discovery signal to the communication node 130. When functionality of the second communication node 210 is limited by a disaster, the electronic device 110 may not notify its emergency to the outside.

To continuously transmit the D2D discovery signal, the electronic device 110 can transmit a first message to the first electronic device 120. The first message can be provided to the first electronic device 120 using the proximity communication. The first message can include information enabling the first electronic device 120 to transmit the D2D discovery signal to the communication node 130 on behalf of the electronic device 110. The first electronic device 120 receiving the first message can transmit the D2D discovery signal to the communication node 130 on behalf of the electronic device 110.

By authorizing the D2D discovery signal transmission to the first electronic device 120, the electronic device 110 can communicate with the second communication node 210 and concurrently transmit the D2D discovery signal to the communication node 130.

Figure 10:
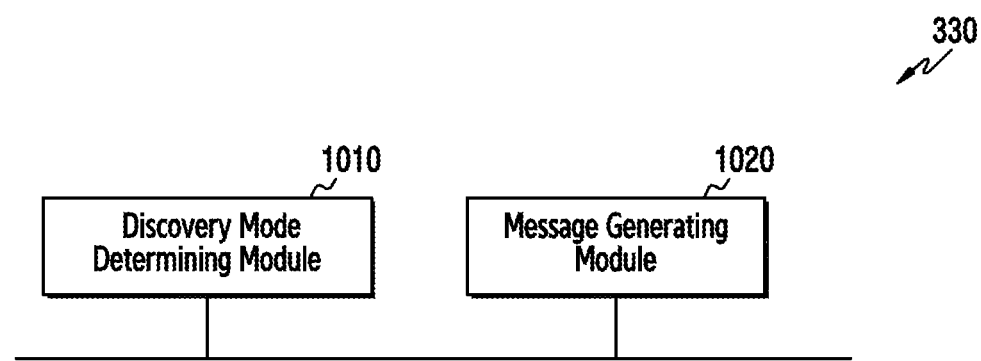
FIG. 10 is a functional block diagram of a controller of an electronic device which authorizes device to device (D2D) communication or discovery to another device according to an embodiment of the present disclosure.

FIG. 10 is a functional block diagram of a controller of an electronic device which authorizes D2D discovery to another device according to an embodiment of the present disclosure, which can be included in the controller 330 of FIG. 3. While the D2D discovery is explained in FIG. 10 by way of example, the structure of FIG. 10 can be applied to the D2D communication.

Referring to FIG. 10, the controller 330 can include a discovery mode determining module 1010 and a message generating module 1020.

The discovery mode determining module 1010 can determine whether the electronic device 110 of FIG. authorizes the D2D discovery communication to the first electronic device 120. The discovery mode determining module 1010 can determine whether to authorize the D2D discovery communication to the first electronic device 120, based on a communication environment of the electronic device 110, a connection state of the electronic device 110 with the other devices, and/or overload of the electronic device 110. For example, when the electronic device 110 is overloaded with the communications with the other devices, the discovery mode determining module 1010 can authorize the D2D discovery communication to the first electronic device 120 in order to obtain an additional RF chain for the D2D discovery.

When determining to authorize the D2D discovery communication to the other device, the discovery mode determining module 1010 can provide authorization information to the message generating module 1020.

The message generating module 1020 can generate an indication message based on the received authorization information. The indication message can include information enabling another device to perform the D2D discovery communication on behalf of the electronic device 110. The indication message can correspond to the first message of FIG. 5, FIG. 6, and FIG. 7.

The message generating module 1020 can generate the indication message including an ID enabling the communication node 130 to recognize the first electronic device 120 as the electronic device 110. The ID can be a virtual ID for the D2D discovery communication.

The message generating module 1020 can generate the indication message including information enabling the first electronic device 120 to conduct the D2D discovery communication. For example, when the first electronic device 120 does not have a resource for the D2D discovery, the message generating module 1020 can generate the indication message including D2D discovery resource information so that the first electronic device 120 can perform the D2D communication. For example, when the first electronic device 120 does not have a resource for the D2D discovery, the message generating module 1020 can generate the indication message including D2D discovery resource acquisition information so that the first electronic device 120 can perform the D2D communication.

The message generating module 1020 can generate the indication message including information about a signal or data to receive at the electronic device 110 through the first electronic device 120. For example, the indication message can include control information for receiving D2D discovery signals of devices (e.g., the communication node 130) near the electronic device 110 (or the first electronic device 120). According to an embodiment, the indication message can include filtering information. For example, when the electronic device 110 wants to obtain only part of the D2D discovery signal received from the first electronic device 120, the message generating module 1020 can generate the indication message including the filtering information.

The message generating module 1020 can generate the indication message including information about a signal or data to transmit from the electronic device 110 through the first electronic device 120. For example, the indication message can include emergency information or disaster information to transmit from the electronic device 110. According to an embodiment, the indication message can include control information for transmitting a D2D discovery signal to a particular mobile station near the electronic device 110 (or the first electronic device 120). For example, when the electronic device 110 wants to transmit the D2D discovery signal only to the communication node 130, the message generating module 1020 can generate the indication message including information of the particular mobile station.

According to various embodiments, the electronic device 110 can obtain an additional RF chain by use of the discovery mode determining module 1010 and the message generating module 1020.

The D2D discovery of FIG. 10 can be replaced by other similar communication methods. For example, the electronic device 110 may authorize the D2D communication to the first electronic device 120 using the discovery mode determining module 1010 and the message generating module 1020.

Figure 11:
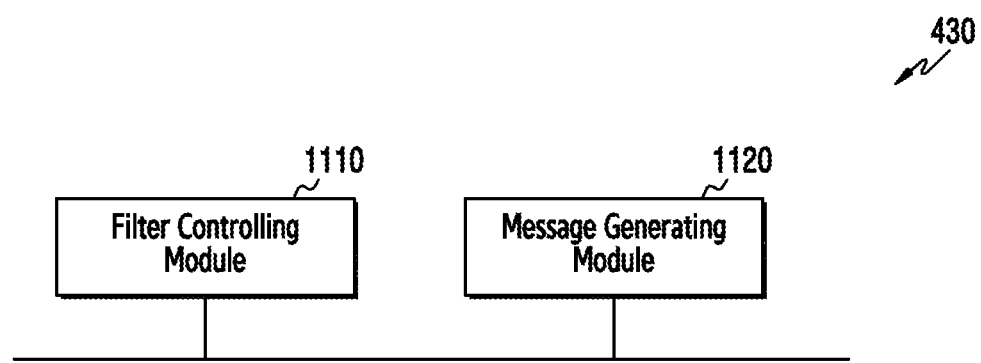
FIG. 11 is a functional block diagram of a controller of an electronic device authorized to conduct D2D communication or discovery from another device according to an embodiment of the present disclosure.

FIG. 11 is a functional block diagram of a controller of an electronic device which is authorized to conduct D2D discovery from another device according to an embodiment of the present disclosure, which can be included in the controller 430 of FIG. 4. While the D2D discovery is explained in FIG. 11 by way of example, the structure of FIG. 11 can be also applied to the D2D communication.

Referring to FIG. 11, the controller 430 can include a filter controlling module 1110 and a message generating module 1120.

When the electronic device 110 includes the information for filtering the D2D discovery signal received from the first electronic device 120, the filter controlling module 1110 can filter part of the D2D discovery signal received from the communication node 130. When the first electronic device 120 receives no filtering information from the electronic device 110, the filter controlling module 1110 may not be included in the controller 430.

The filter controlling module 1110 can filter and provide the received D2D discovery signal to the message generating module 1120.

When the first electronic device 120 receives a D2D discovery signal from the communication node 130, the message generating module 1120 can generate a report message for forwarding the received D2D discovery signal to the electronic device 110. According to various embodiments, the message generating module 1120 may generate the report message by processing the received D2D discovery signal.

The electronic device 110 can determine to authorize D2D discovery to the first electronic device 120 in order to obtain the communication capacity. The electronic device 110 can generate the indication message by including D2D discovery information. The electronic device 110 can transmit the report message to the first electronic device 120.

The first electronic device 120 can receive an indication message regarding the D2D discovery authorization from the electronic device 110. The first electronic device 120 can be recognized by the communication node 130 as the electronic device 110 based on the indication message. The first electronic device 120 can obtain a resource for the D2D discovery based on the indication message. According to various embodiments, the first electronic device 120 may obtain the resource for the D2D discovery directly from the second communication node 210 of FIG. 2 based on the indication message. The first electronic device 120 can receive a D2D discovery signal from the communication node 130 based on the indication message. The first electronic device 120 can transmit a D2D discovery signal to the communication node 130 based on the indication message. The first electronic device 120 can filter the received D2D discovery signal based on the indication message. The first electronic device 120 can generate a report message based on the received D2D discovery signal or the filtered D2D discovery signal. The first electronic device 120 can transmit the generated report message to the electronic device 110.

Figure 12:
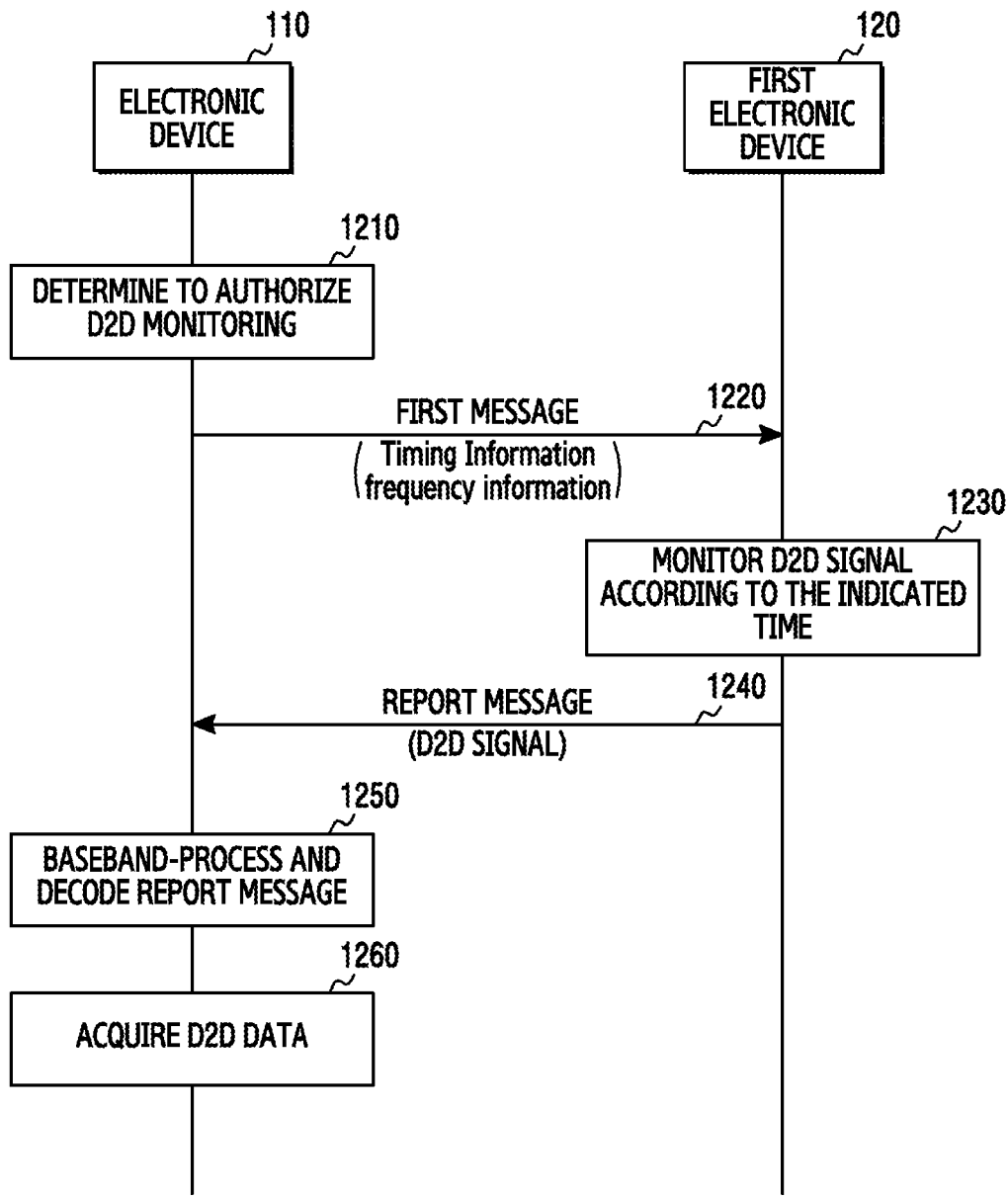
FIG. 12 is a diagram illustrating signaling between electronic devices for D2D signal transmission or reception according to an embodiment of the present disclosure.

FIG. 12 is a diagram illustrating signaling between electronic devices for D2D signal transmission or reception according to an embodiment of the present disclosure, which can be generated by the electronic device 110 and the first electronic device 120 of FIG. 1.

Referring to FIG. 12, in operation 1210, the electronic device 110 can determine to authorize D2D monitoring to the first electronic device 120. The D2D monitoring includes both of the D2D discovery and the D2D data communication reception. The monitoring can indicate D2D discovery signal reception or D2D data communication signal reception of other devices near the electronic device 110. When determining that an additional resource is required (e.g., when an additional virtual RF chain is required as shown in Table 2), the electronic device 110 can determine to authorize the D2D monitoring to the first electronic device 120. When a battery level of the electronic device 110 is below a preset level, the electronic device 110 can determine to authorize even though multiple RF chains are equipped.

In operation 1220, the electronic device 110 can transmit a first message to the first electronic device 120. The first message can include information indicating the D2D monitoring to the first electronic device 120. According to some embodiments, the electronic device 110 may select and authorize baseband processing of the RF signal reception and decoding of layer 1 and layer 2. The first message can include timing information and frequency information of the D2D.

In operation 1230, the first electronic device 120 can monitor the D2D discovery according to the indicated time and frequency resource based on the first message. The first electronic device 120 can attempt to detect a D2D signal from another device during the indicated time duration. The signal can be detected at an RF level. According to various embodiments, the first electronic device 120 may select and monitor only D2D signals of a specific device.

In operation 1240, the first electronic device 120 can transmit the report message to the electronic device 110. The report message can include the detected D2D signal. The D2D signal can be a (RF level) signal not controlled to obtain D2D data of the signal.

In operation 1250, the electronic device 110 can baseband-process the received report message. Also, the electronic device 110 can decode the baseband-processed report message.

In operation 1260, the electronic device 110 can obtain the D2D data of the D2D signal through the L2 layer decoding.

The communication node 130 transmits the D2D signal to the first electronic device 120 but recognizes that the signal is transmitted to the electronic device 110. The first electronic device 120 can receive a D2D signal from the communication node 130 on behalf of the electronic device 110.

Figure 13:
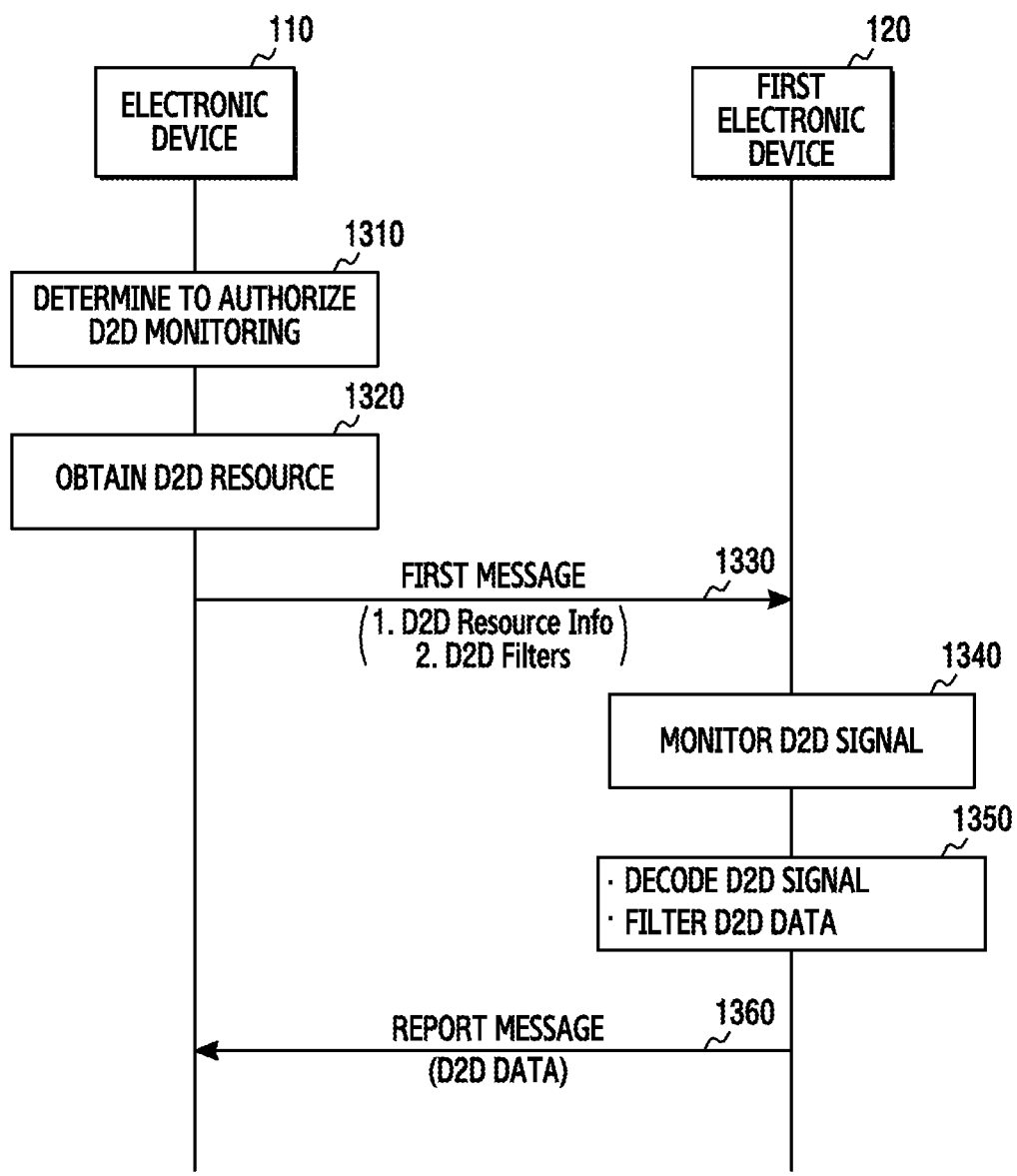
FIG. 13 is a signal flow diagram between electronic devices for D2D signal transmission or reception according to an embodiment of the present disclosure.

FIG. 13 is a signal flow diagram between electronic devices for D2D signal transmission or reception according to an embodiment of the present disclosure, which can be generated by the electronic device 110 and the first electronic device 120 of FIG. 1.

Referring to FIG. 13, in operation 1310, the electronic device 110 can determine to authorize D2D monitoring to the first electronic device 120. The D2D monitoring can include the D2D discovery monitoring and the D2D data communication reception. When determining that an additional resource is required (e.g., when the additional virtual RF chain is required as shown in Table 2), the electronic device 110 can determine to authorize some of its operations to the first electronic device 120. When a battery level of the electronic device 110 is below a preset level, the electronic device 110 can determine to authorize some of its operations to the first electronic device 120 even though multiple RF chains are equipped.

In operation 1320, the electronic device 110 can obtain resource information and frequency information for the D2D authorization from a base station (e.g., the second communication node 210 of FIG. 2). According to various embodiments, the information can be acquired in various manners. In some embodiments, the electronic device 110 can acquire resource chunk information by receiving system information block (SIB) 19 from a serving base station or a neighbor base station. In some other embodiments, the electronic device 110 can be allocated resource and frequency information by sending a resource request message to the base station. In some other embodiments, the electronic device 110 may be pre-configured.

In operation 1330, the electronic device 110 can transmit a first message to the first electronic device 120. The first message can include information indicating the D2D monitoring to the first electronic device 120. The D2D monitoring can include D2D discovery signal reception and D2D data communication signal reception. According to various embodiments, the electronic device 110 can select and authorize RF signal reception, baseband processing, and layer 1, layer 2 decoding to the first electronic device 120. The first message can include resource information for the D2D. For example, the first message can include frequency resource information and time resource information for the D2D. The first message can include information for filtering D2D data obtained from the D2D signal. For example, in the D2D discovery, the information for filtering the D2D data can include information to be discovered by the electronic device. For example, in the D2D data communication, the information for filtering the D2D data can include information of a destination ID. The first electronic device 120 can discard D2D information not matching the filter based on the first message.

In operation 1340, the first electronic device 120 can monitor a D2D discovery signal based on the first message.

In operation 1350, the first electronic device 120 can decode the received D2D signal. The first electronic device 120 can obtain D2D data by decoding the received D2D signal. The D2D signal decoding can receive an RF signal, generate Layer 1 information by baseband-processing the RF signal, and generate D2D data by decoding the generated Layer 1 information in Layer 2. The first electronic device 120 can filter the obtained D2D data. For example, the first electronic device 120 can filter the obtained D2D data according to importance or preference of the electronic device based on the first message.

In operation 1360, the first electronic device 120 can transmit the report message including the filtered D2D data to the electronic device 110.

The first electronic device 120 can receive a D2D signal from the communication node 130 on behalf of the electronic device 110.

Figure 14:
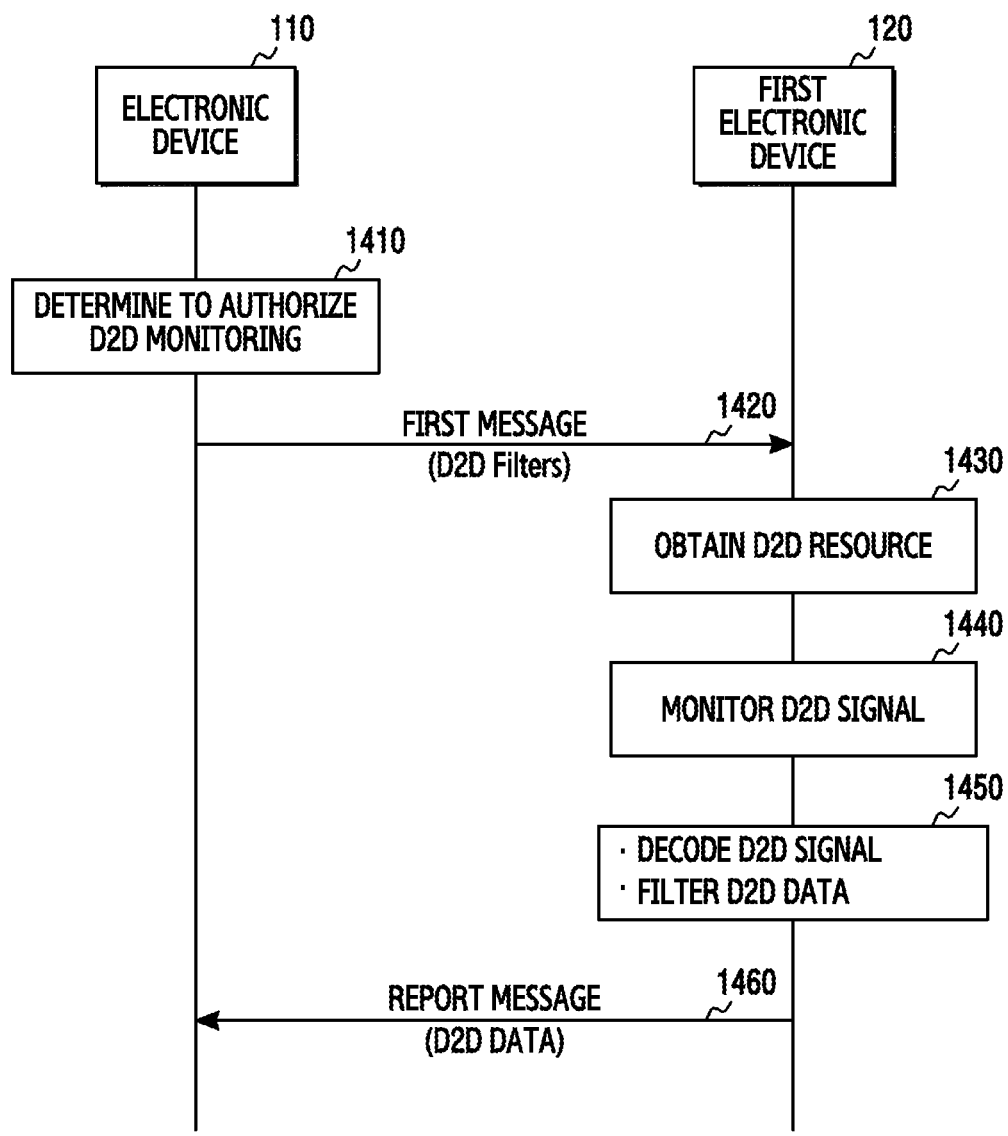
FIG. 14 is a diagram illustrating signaling between electronic devices for D2D signal transmission or reception according to an embodiment of the present disclosure.

FIG. 14 is a diagram illustrating signaling between electronic devices for D2D signal transmission or reception according to an embodiment of the present disclosure, which can be generated by the electronic device 110 and the first electronic device 120 of FIG. 1.

Referring to FIG. 14, in operation 1410, the electronic device 110 can determine to authorize D2D monitoring to the first electronic device 120. The D2D monitoring can include the D2D discovery monitoring and the D2D data communication reception. When determining that an additional resource is required (e.g., when the electronic device 110 requires the additional virtual RF chain as shown in Table 2), the electronic device 110 can determine to authorize some of its operations to the first electronic device 120. When a battery level of the electronic device 110 is below a preset level, the electronic device 110 can determine to authorize some of its operations to the first electronic device 120 even though multiple RF chains are equipped.

In operation 1420, the electronic device 110 can transmit a first message to the first electronic device 120. The first message can include information indicating the D2D monitoring to the first electronic device 120. According to various embodiments, the electronic device 110 can select and authorize RF signal reception, baseband processing, and layer 1, layer 2 decoding to the first electronic device 120. The first message can include information for filtering D2D data obtained from the D2D signal. For example, in the D2D discovery, the information for filtering the D2D data can include information to be discovered by the electronic device 110. For example, in the D2D data communication, the information for filtering the D2D data can include information of a destination ID. The first electronic device 120 can discard D2D information not matching the filter based on the first message.

In operation 1430, the first electronic device 120 can obtain D2D resource. The first electronic device 120 can receive the D2D resource information from a base station (e.g., the electronic device 210 of FIG. 2). The resource information can be obtained in various manners according to various embodiments. For example, the electronic device 110 can acquire resource chunk information by receiving SIB 19 from a serving base station or a neighbor base station. For example, the electronic device 110 can be allocated resource and frequency information by sending a resource request message to the base station. For example, the electronic device 110 can be pre-configured. The first electronic device 120 can obtain the D2D resource based on the received resource information for the D2D.

In operation 1440, the first electronic device 120 can monitor a D2D discovery signal based on the first message. For example, the first electronic device 120 can monitor a signal transmitted from the communication node 130 based on the first message.

In operation 1450, the first electronic device 120 can decode the received D2D signal. The first electronic device 120 can obtain D2D data by decoding the received D2D discovery signal. The first electronic device 120 can filter the obtained D2D data. For example, the first electronic device 120 can filter some of the acquired data based on the filtering information of the first message. The D2D signal decoding can receive an RF signal, generate Layer 1 information by baseband-processing the RF signal, and generate D2D data by decoding the generated Layer 1 information in Layer 2.

In operation 1460, the first electronic device 120 can transmit the report message including the filtered D2D data to the electronic device 110.

Although the communication node 130 transmits the D2D signal to the first electronic device 120 in FIG. 14, an effect of receiving the signal at the electronic device can be attained. In other words, the first electronic device 120 can be transparent to the communication node 130. The first electronic device 120 can receive a D2D signal from the communication node 130 on behalf of the electronic device 110.

Figure 15:
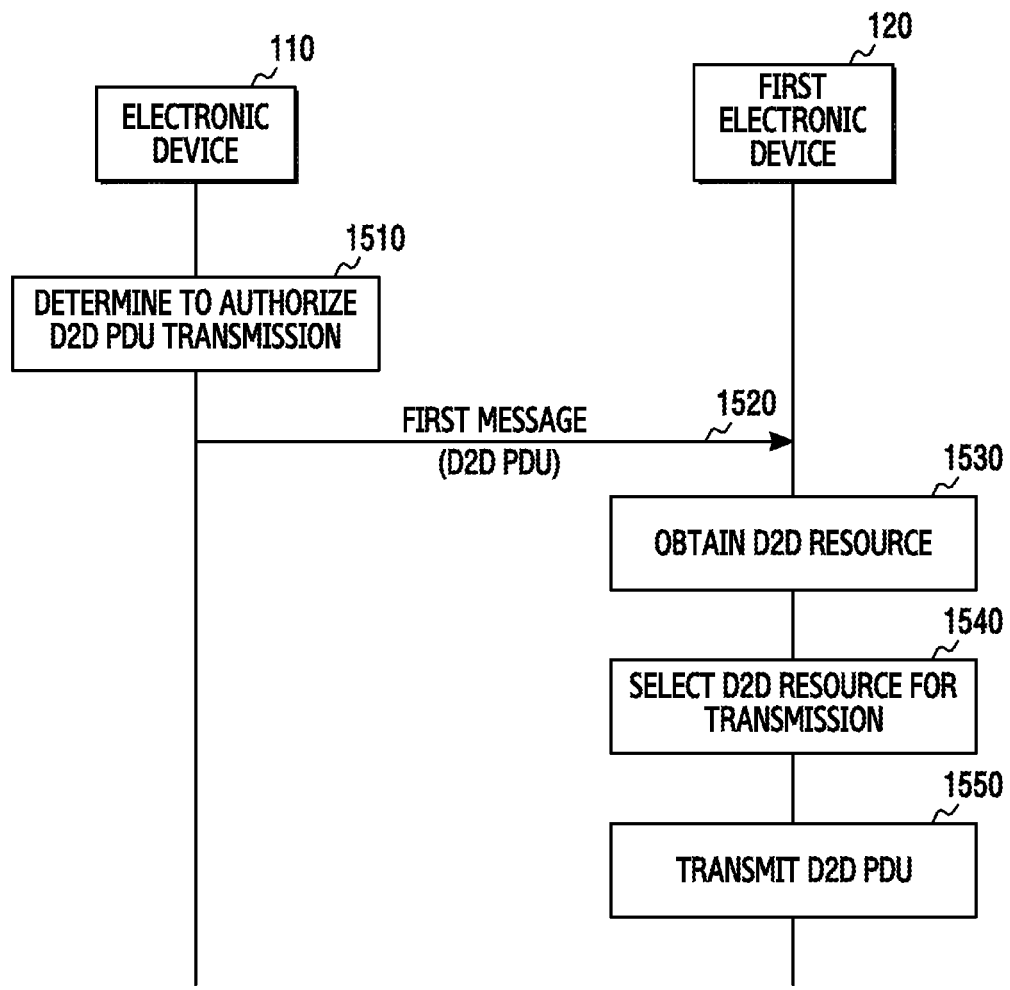
FIG. 15 is a signal flow diagram between electronic devices for D2D signal transmission or reception according to an embodiment of the present disclosure.

FIG. 15 depicts a signal flow between electronic devices for D2D signal transmission or reception according to an embodiment of the present disclosure, which can be generated by the electronic device 110 and the first electronic device 120 of FIG. 1.

Referring to FIG. 15, in operation 1510, the electronic device 110 can determine to authorize D2D data transmission to the first electronic device 120. The D2D data transmission can include D2D discovery transmission and D2D data communication transmission. The D2D data can be transmitted as a protocol data unit (PDU). When resources for the D2D PDU transmission are not sufficient (e.g., when the RF chain is not sufficient) due to communications with other devices (e.g., the electronic device 210 of FIG. 2), the electronic device 110 can determine to authorize the D2D PDU transmission to the first electronic device 120. According to a difference of a transmission power and a reception power, the electronic device 110 can compare its battery level with a battery level of the first electronic device 120 and thus determine to authorize the D2D data transmission to the first electronic device 120.

In operation 1520, the electronic device 110 can transmit a first message to the first electronic device 120. The first message can include the D2D PDU.

In operation 1530, the first electronic device 120 can obtain the D2D resource. The first electronic device 120 can receive information of the D2D discovery resource from a base station (e.g., the second communication node 210). The resource information can be acquired in various manners. For example, the electronic device 110 can obtain resource chunk information by receiving SIB 19 from a serving base station or a neighbor base station. For example, the electronic device 110 can be allocated resource and frequency information by sending a resource request message to the base station. For example, the electronic device 110 can be pre-configured. The first electronic device 120 can obtain the D2D discovery resource based on the received D2D discovery resource information.

In operation 1540, the first electronic device 120 can select a resource for the D2D PDU transmission from the acquired D2D discovery resources. According to various embodiments, the first electronic device 120 may select and obtain only the resource for the D2D PDU transmission in the operation 1530. In this case, the operation 1540 can be omitted.

In operation 1550, the first electronic device 120 can transmit the D2D PDU based on the selected resource. The D2D PDU can be broadcast unspecified mobile stations or transmitted to a specific mobile station (e.g., the communication node 130 of FIG. 1).

Figure 16:
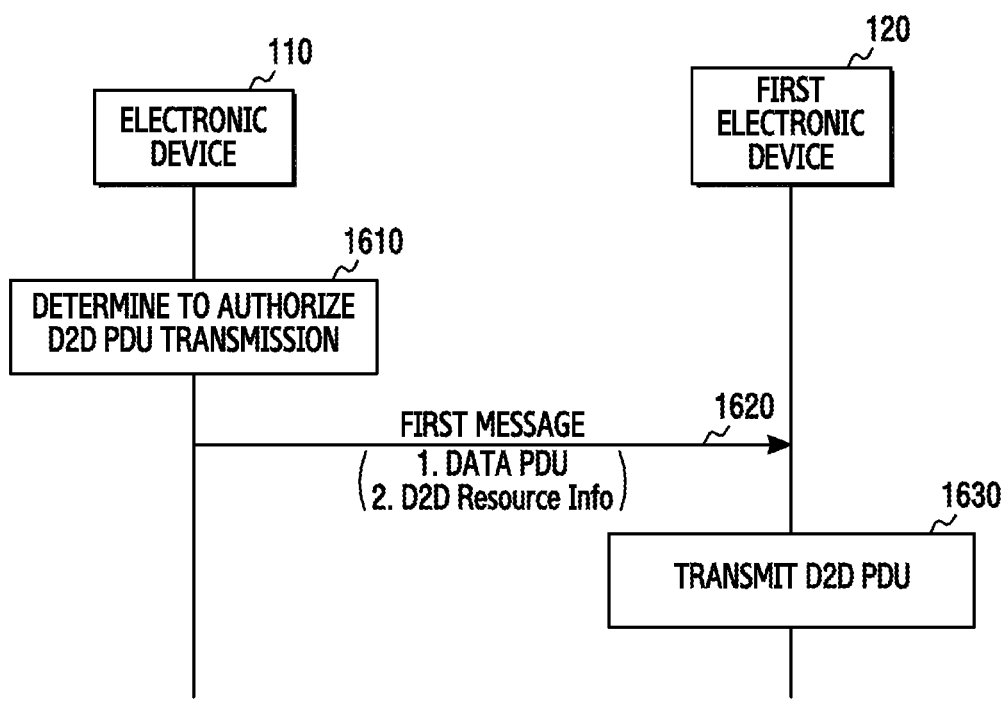
FIG. 16 is a signal flow diagram between electronic devices for D2D signal transmission or reception according to an embodiment of the present disclosure.

FIG. 16 depicts a signal flow between electronic devices for D2D signal transmission or reception according to an embodiment of the present disclosure, which can be generated by the electronic device 110 and the first electronic device 120 of FIG. 1.

Referring to FIG. 16, in operation 1610, the electronic device 110 can determine to authorize D2D PDU transmission to the first electronic device 120. The D2D PDU transmission can include D2D discovery transmission and D2D data communication transmission. Without sufficient resources, for example, without the RF chain due to communications with other devices, the electronic device 110 can determine to authorize the D2D PDU transmission to the first electronic device 120. According to a difference of a transmission power and a reception power, the electronic device 110 can compare its battery level with a battery level of the first electronic device 120 and thus determine to authorize the D2D data transmission.

In operation 1620, the electronic device 110 can transmit a first message to the first electronic device 120. The first message can include the D2D discovery PDU. The first message can include resource information for the D2D discovery. The resource information can be obtained in various manners. For example, the electronic device 110 can obtain resource chunk information by receiving SIB 19 from a serving base station or a neighbor base station. For example, the electronic device 110 can be allocated resource and frequency information by sending a resource request message to the base station. For example, the electronic device 110 can be pre-configured.

In operation 1630, the first electronic device 120 can transmit the D2D PDU based on the D2D resource. According to various embodiments, the first electronic device 120 can select the resource for the D2D PDU transmission from the D2D resources. The first electronic device 120 can transmit the D2D PDU using the selected resource. In some embodiments, the first electronic device 120 may transmit the D2D PDU using resource information allocated from the base station. The D2D PDU can be broadcast unspecified mobile stations or transmitted to a specific mobile station (e.g., the communication node 130 of FIG. 1).

Figure 17A:
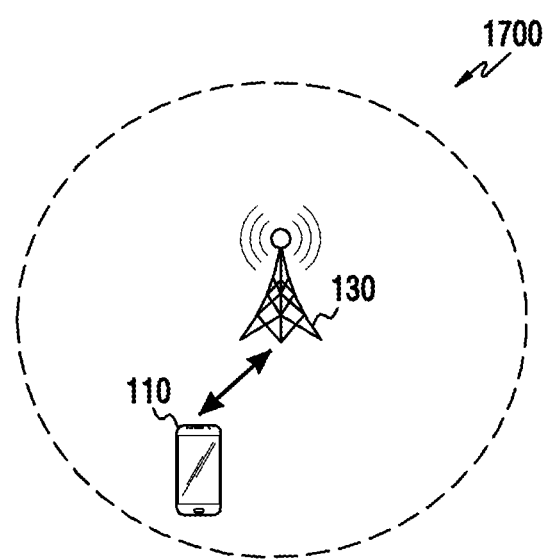
FIGS. 17A and 17B are diagrams of a network for transmitting and receiving signals through carrier aggregation according to an embodiment of the present disclosure.
Figure 17B:
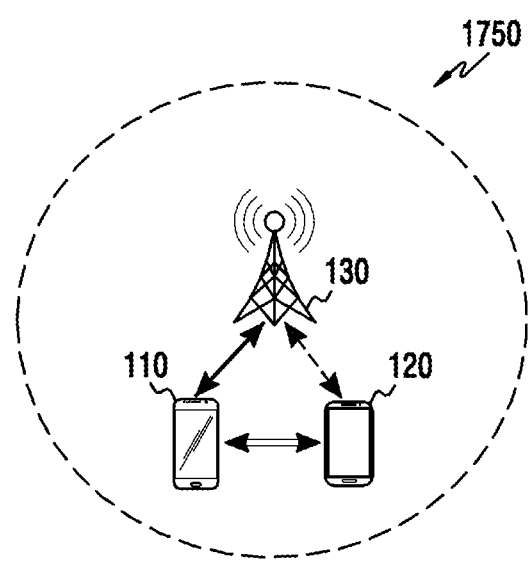

FIGS. 17A and 17B are diagrams of a network for transmitting and receiving signals through CA according to an embodiment of the present disclosure.

Referring to FIG. 17A, the network 1700 can include the electronic device 110 and the communication node 130 of FIG. 1.

The electronic device 110 can be a UE or a mobile station. The communication node 130 can be an eNB or a base station.

The electronic device 110 can communicate with the communication node 130. The electronic device 110 can communicate with the communication node 130 through the CA. The communication node 130 can utilize N-ary CCs. The number of CCs used by the electronic device 110 can be M which is smaller than N. The communication node 130 can communicate with the electronic device 110 using the smaller number of CCs (e.g., M-ary CCs, rather than N-ary CCs) due to the resource limitation of the electronic device 110. Such limitation can lower a communication speed of the electronic device 110 and the communication node 130.

Referring to FIG. 17B, the network 1750 can include the electronic device 110, the first electronic device 120, and the communication node 130.

The electronic device 110 and the first electronic device 120 can be UEs or mobile stations. The communication node 130 can be an eNB or a base station.

The electronic device 110 can communicate with the communication node 130 through the CA. The communication node 130 can utilize N-ary CCs. The number of CCs used by the electronic device 110 can be M which is smaller than N. To obtain an additional CC for the CA, the electronic device 110 can transmit an indication message (hereafter, referred to as a first message) to the first electronic device 120. The first message can include information enabling the communication node 130 to recognize the first electronic device 120 as the electronic device 110. Hence, the communication node 130 can recognize the first electronic device 120 as the electronic device 110. The first message can include information of a signal to transmit from the electronic device 110 and the communication node 130. The first message can include information of a signal to receive at the electronic device 110 from the communication node 130. In response to the first message reception, the first electronic device 120 can communicate with the communication node 130 through the additional CC. The communication node 130 can recognize the first electronic device 120 as the electronic device 110. Thus, the electronic device 110 can add the additional CC with the aid of the first electronic device 120 and thus communicate with the communication node 130 through the CA.

Figure 18:
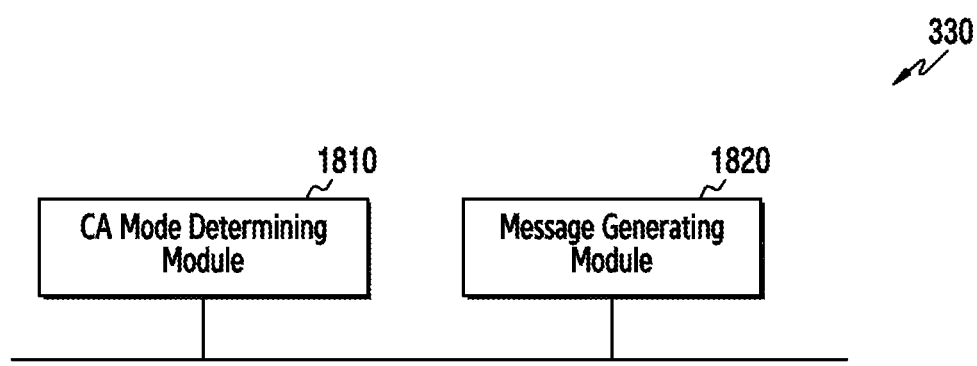
FIG. 18 is a functional block diagram of a controller of an electronic device for performing carrier aggregation through another device according to an embodiment of the present disclosure.

FIG. 18 is a functional block diagram of a controller of an electronic device for performing CA through another device according to an embodiment of the present disclosure, which can be included in the controller 330 of FIG. 3.

Referring to FIG. 18, the controller 330 can include a CA mode determining module 1810 and a message generating module 1820.

The CA mode determining module 1810 can determine whether the electronic device 110 performs the CA using the first electronic device 120. When the number of available CCs of the electronic device 110 is insufficient, the CA mode determining module 1810 can determine to conduct the CA through the first electronic device 120. For example, when data needs to be received within a certain time, the CA mode determining module 1810 can determine to perform the CA through the first electronic device 120 for rapid data transmission and reception.

The CA mode determining module 1810 can provide the message generating module 1830 with information indicating the CA through the first electronic device 120.

When receiving the CA information using the first electronic device 120, the message generating module 1830 can generate an indication message (hereafter, referred to as a first message) destined for the first electronic device 120.

The message generating module 1830 can generate the first message including information which enables the communication node 130 to recognize the first electronic device 120 as the electronic device 110. For example, the message generating module 1830 can generate the first message including a virtual ID. The communication node 130 can recognize the first electronic device 120 as the electronic device 110 using the virtual ID.

The message generating module 1830 can generate the first message including information of a signal to transmit from the electronic device 110 to the communication node 130 or information of a signal to receive at the electronic device 110 from the communication node 130. The first electronic device 120 can assist the communication of the electronic device 110 and the communication node 130 based on the transmit signal information or the receive signal information.

According to various embodiments, the electronic device 110 can communicate with the communication node 130 through the CA using more CCs by means of the CA mode determining module 1810 and the message generating module 1820.

Figure 19:
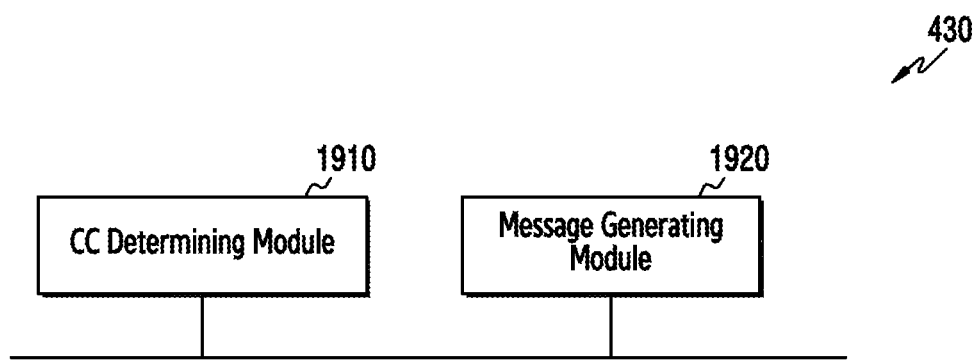
FIG. 19 is a functional block diagram of a controller of an electronic device for performing carrier aggregation to assist another device according to an embodiment of the present disclosure.

FIG. 19 is a functional block diagram of a controller of an electronic device for performing CA to assist another device according to an embodiment of the present disclosure, which can be included in the controller 430 of FIG. 4.

Referring to FIG. 19, the controller 430 can include a CC determining module 1910 and a message generating module 1920.

The CC determining module 1910 can determine a CC for assisting in the communication of the electronic device 110. When the first electronic device 120 receives an indication message from the electronic device 110, the CC determining module 1910 can determine the CC to be used for the CA for the electronic device 110. The CC determining module 1910 can select an adequate CA for the CA of the electronic device 110 from available CCs of the first electronic device 120. The CC determining module 1910 can determine the CC for the CA based on a state of the electronic device 110, a state of the first electronic device 120, and/or a state of the communication node 130.

The CC determining module 1910 can transmit the determined CC information to the message generating module 1920.

When the first electronic device 120 receives a signal from the communication node 130 through the determined CC, the message generating module 1920 can generate a report message to forward the received signal to the electronic device 110. The message generating module 1920 can generate the report message including the received message. When the first electronic device 120 decodes the received signal, the first electronic device 120 may generate the report message including the decoded signal.

The generated report message can be provided to the electronic device 110 through the WAN communication interface 410 or the proximity communication interface 420 of FIG. 4.

Figure 20:
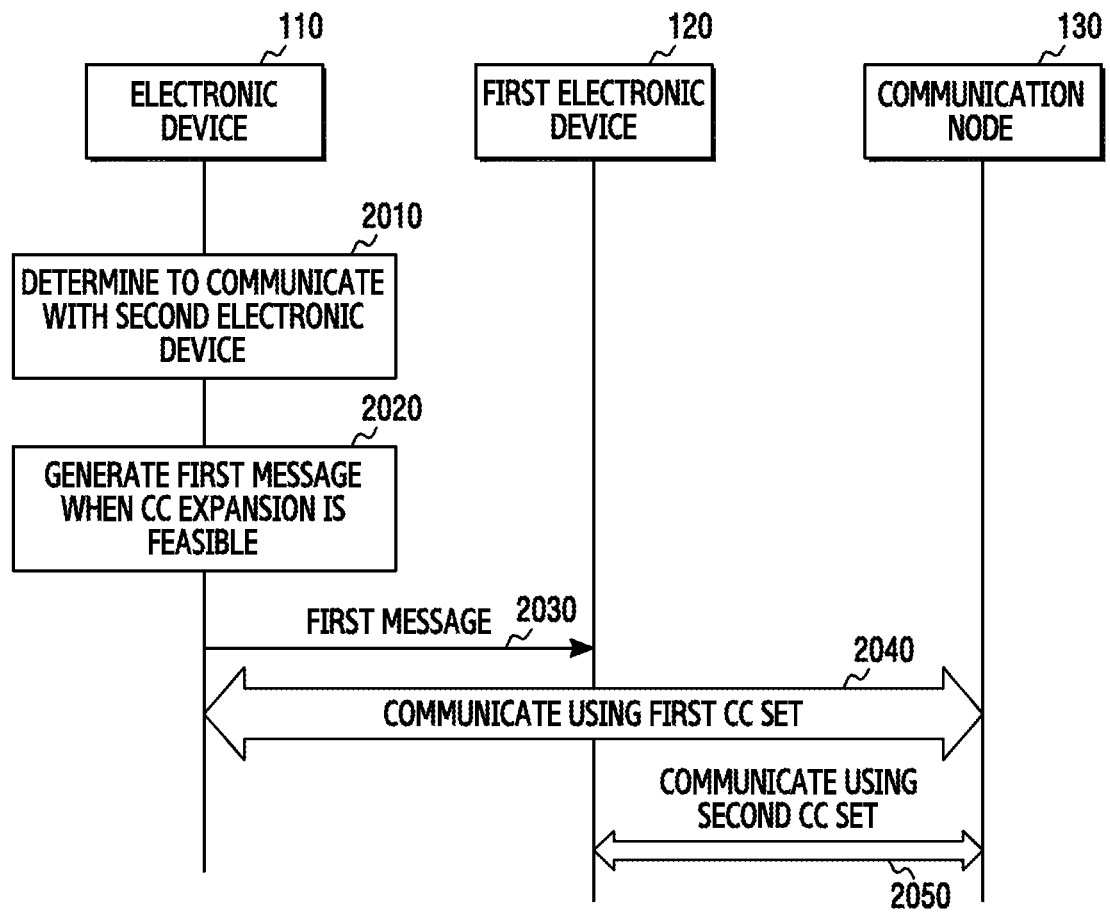
FIG. 20 is a signal flow diagram of electronic devices for communicating through carrier aggregation using another device according to an embodiment of the present disclosure.

FIG. 20 is a signal flow diagram of electronic devices for communicating through CA using another device according to an embodiment of the present disclosure, which can take place in the electronic device 110, the first electronic device 120, and the communication node 130 of FIG. 1.

Referring to FIG. 20, in operation 2010, the electronic device 110 can determine to communicate with the communication node 130. For example, the electronic device 110 can determine to communicate with the communication node 130 through the CA.

When the CA through CC expansion is feasible, the electronic device 110 can generate a first message in operation 2020. The CC expansion can increase the number of supportable CCs for the CA. The CC expansion can indicate more CCs than the supportable CCs with the capability of the electronic device 110. The first message can be generated by the electronic device 110 to conduct the enhanced CA with the aid of the first electronic device 120. The first message can be referred to as an indication message. The first message can include information enabling the communication node 130 to recognize the first electronic device 120 as the electronic device 110. The first message can include information of signals to exchange with the communication node 130. According to various embodiments, the first message can include CC information used by the electronic device 110 to communicate with the communication node 130.

In operation 2030, the electronic device 110 can transmit the first message to the first electronic device 120 through the proximity communication. A resource used for the proximity communication can be different from a resource for the communication with the communication node 130. The first electronic device 120 can confirm the CC expansion requested by the electronic device 110.

In operation 2040, the electronic device 110 can communicate with the communication node 130 through a first CC set. The first CC set can be a set of CCs used for the communication of the electronic device 110 and the communication node 130.

In operation 2050, the first electronic device 120 can communicate with the communication node 130 through a second CC set. The second CC set can be a set of CCs used by the first electronic device 120 to communicate with the communication node 130. Although not depicted in FIG. 20, the first electronic device 120 can transmit a report message to the electronic device 110 through the proximity communication in the operation 2050. The report message can include information about signals or data exchanged between the first electronic device 120 and the communication node 130.

In view of the communication node 130, the first electronic device 120 can be recognized as the electronic device 110. Accordingly, the electronic device 110 can communicate with the communication node 120 through the enhanced CA.

The set for the CA can be applied to one or more frequency bands. The CA authorization can be applied to at least one of a downlink and an uplink according to system setting.

Figure 21:
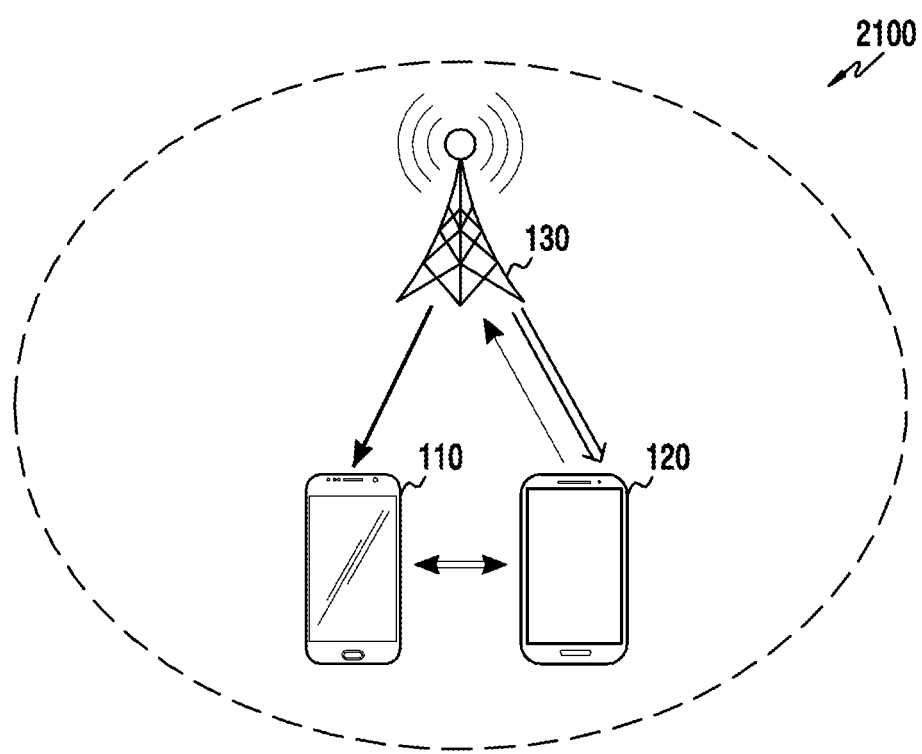
FIG. 21 is a diagram of a network using another electronic device for power control according to an embodiment of the present disclosure.

FIG. 21 depicts a network using another electronic device for power control according to an embodiment of the present disclosure.

Referring to FIG. 21, the network 2100 can include the electronic device 110, the first electronic device 120, and the communication node 130 of FIG. 1.

The electronic device 110 and the first electronic device 120 can be UEs or mobile stations. The communication node 130 can be an eNB or a base station.

The electronic device 110 can communicate with the communication node 130. The electronic device 110 may require power management. For example, the electronic device 110 may have a little remaining capacity of a battery. For example, the electronic device 110 can be located on a coverage edge of the communication node 130. When the electronic device 110 is far away from the communication node 130 (i.e., when the electronic device 110 is on the coverage edge of the communication node1 130), the electronic device 110 may have to transmit a signal to the communication node 130 using a higher power than usual.

For the power management, the electronic device 110 can transmit or receive a signal via the first electronic device 120. For the power management, the electronic device 110 can authorize the communication with the communication node 130 to the first electronic device 120. In some embodiments, when a power level of the electronic device 110 falls below a first threshold, the electronic device 110 can authorize only the transmission to the first electronic device 120. In some other embodiments, when the power level of the electronic device 110 falls below a second threshold, the electronic device 110 can authorize the transmission and the reception to the first electronic device 120. The second threshold can be a power level lower than the first threshold. The above-stated embodiments can be realized in successive operations.

In some other embodiments, the electronic device 110 can measure a downlink (DL) reference signal received power (RSRP), RSR quality (RSRQ), or received signal strength indicator (RSSI). When the measured value is below a third threshold, the electronic device 110 can recognize a far distance from the communication node 130. In this case, the electronic device 110 can authorize only the signal transmission to the first electronic device 120. The electronic device 110 may measure DL RSRP/RSRQ/RSSI, and, when the measured value is below a fourth threshold, authorize signal transmission and reception to the first electronic device 120. The fourth threshold can be lower than the third threshold. The above-stated embodiments can be realized in successive operations.

According to various embodiments, the electronic device 110 may combine the operations regarding the first through fourth thresholds.

For the authorization, the electronic device 110 can transmit an indication message to the first electronic device 120. The indication message may be referred to as a first message. The first message can include information enabling the communication node 130 to recognize the first electronic device 120 as the electronic device 110. The first message can include information of a signal to transmit from the electronic device 110 to the communication node 130 through the first electronic device 120. The first message can include information of a signal to receive at the electronic device 110 from the communication node 130 through the first electronic device 120. The first message can be delivered to the first electronic device 120 using the proximity communication.

The electronic device 110 can give other authorities to the first electronic device 120. For example, the electronic device 110 can authorize only the signal transmission to the communication node 130, to the first electronic device 120. For example, the electronic device 110 can authorize only the signal reception from the communication node 130, to the first electronic device 120. For example, the electronic device 110 can authorize the first electronic device electronic device to not only receive a signal but also decode and provide the received signal.

The first electronic device 120 can transmit a signal to the communication node 130 based on the first message. The first electronic device 120 can receive a signal from the communication node 130 based on the first message. The communication node 130 can recognize the first electronic device 120 as the electronic device 110.

For the power management, the electronic device 110 can authorize part (e.g., RF/baseband processing/Layer 2 processing) of the communication authority to the first electronic device 120. The electronic device 110 can reduce its power consumption by virtue of the first electronic device 120.

Figure 22:
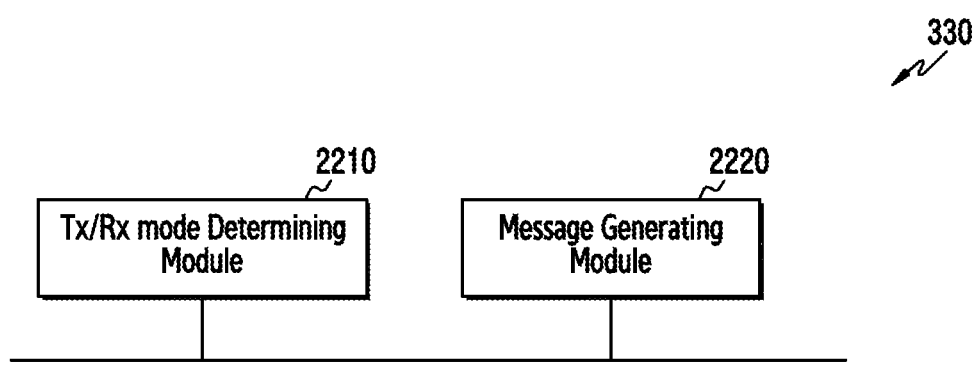
FIG. 22 is a functional block diagram of a controller of an electronic device for managing power using another device according to an embodiment of the present disclosure.

FIG. 22 is a functional block diagram of a controller of an electronic device which manages power using another device according to an embodiment of the present disclosure, which can be included in the controller 330 of FIG. 3.

Referring to FIG. 22, the controller 330 can include a Tx/Rx mode determining module 2210 and a message generating module 2220.

The Tx/Rx mode determining module 2210 can determine whether the electronic device 110 requires power management. For example, when a battery of the electronic device 110 almost runs out, the Tx/Rx mode determining module 2210 can determine that it is necessary to manage the power of the electronic device 110. For example, when the electronic device 110 suffers from poor transmission (e.g., when the electronic device 110 is on a cell coverage edge), the Tx/Rx mode determining module 2210 can determine that it is necessary to manage the power of the electronic device 110.

For the power management of the electronic device 110, the Tx/Rx mode determining module 2210 can determine to transmit or receive a signal through the first electronic device 120.

The Tx/Rx mode determining module 2210 can provide the message generating module 2220 with information indicating that the signal transmission or reception through the first electronic device 120 is required.

The message generating module 2220 can generate an indication message (hereafter, referred to as a first message) destined for the first electronic device 120.

The message generating module 2220 can generate the first message including information which enables the communication node 130 to recognize the first electronic device 120 as the electronic device 110. For example, the message generating module 2220 can generate the first message including a virtual ID. The communication node 130 can recognize the first electronic device 120 as the electronic device 110 using the virtual ID.

The message generating module 2220 can generate the first message including information of a signal to transmit from the electronic device 110 to the communication node 130 or information of a signal to receive at the electronic device 110 from the communication node 130. The first electronic device 120 can assist the communication of the electronic device 110 and the communication node 130 based on the transmit signal information or the receive signal information.

According to various embodiments, the electronic device 110 can manage its power and communicate with the communication node 130 by means of the Tx/Rx mode determining module 2210 and the message generating module 2220.

Figure 23:
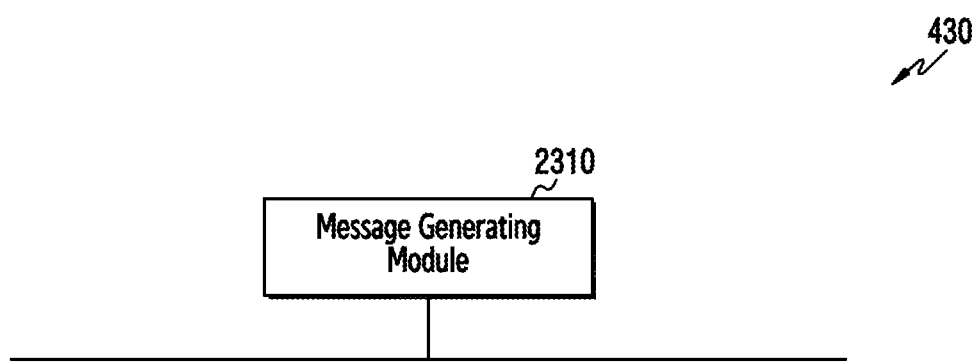
FIG. 23 is a functional block diagram of a controller of an electronic device for communicating in aid of another device according to an embodiment of the present disclosure.

FIG. 23 is a functional block diagram of a controller of an electronic device for communicating in aid of another device according to an embodiment of the present disclosure, which can be included in the controller 430 of FIG. 4.

Referring to FIG. 23, the controller 430 can include a message generating module 2310.

The message generating module 2310 can generate a report message destined for the electronic device 110. When the first electronic device 120 receives a signal from the communication node 130, the message generating module 2310 can generate a report message including the received signal information. The message generating module 2310 can generate the report message including the received signal. The first electronic device 120 can obtain data from the received signal by decoding the received signal. The message generating module 2310 may generate the report message including the acquired data.

The generated report message can be provided to the electronic device 110 through the WAN communication interface 410 or the proximity communication interface 420 of FIG. 4.

According to various embodiments, the first electronic device 120 can transmit a signal to the communication node 130 on behalf of the electronic device 110. The first electronic device 120 can receive a signal from the communication node 130 on behalf of the electronic device 110. Through the signal transmission or the signal reception, the electronic device 110 can efficiently manage the power. The first electronic device 120 can assist in the power management of the electronic device 110.

Figure 24:
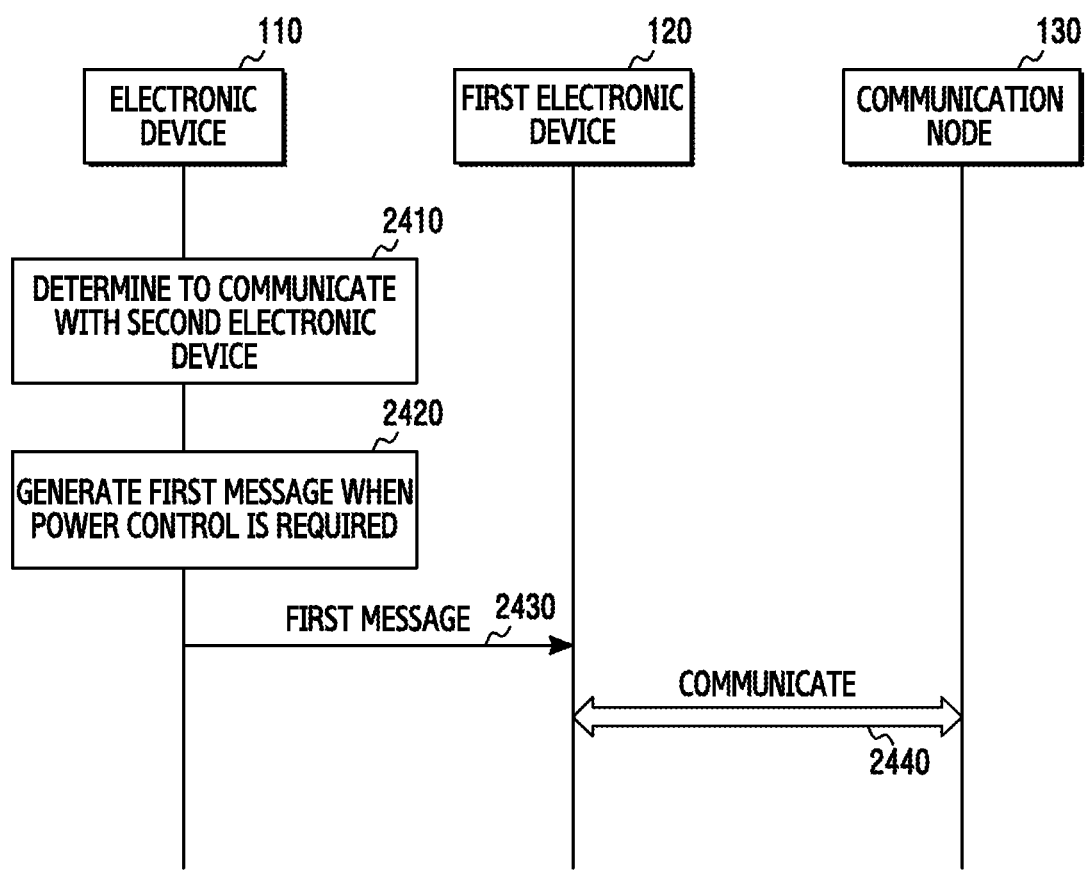
FIG. 24 is a signal flow diagram of electronic devices for managing power using another device according to an embodiment of the present disclosure.

FIG. 24 depicts a signal flow of electronic devices for managing power using another device according to an embodiment of the present disclosure, which can take place in the electronic device 110, the first electronic device 120, and the communication node 130 of FIG. 1.

Referring to FIG. 24, in operation 2410, the electronic device 110 can determine to communicate with the communication node 130. The electronic device 110 can need to manage its power. For example, the electronic device 110 can have an almost dead battery or reside on a cell coverage edge.

In operation 2420, the electronic device 110 can generate a first message. For the efficient power management (e.g., to reduce power consumption), the first electronic device 110 can generate the first message. The first message can be referred to as an indication message. The first message can include information enabling the communication node 130 to recognize the first electronic device 120 as the electronic device 110.

In operation 2430, the electronic device 110 can transmit the first message to the first electronic device 120 through the proximity communication.

In operation 2440, the first electronic device 120 can communicate with the communication node 130. For example, the first electronic device 120 can transmit a signal of the electronic device 110 to the communication node 130. For example, the first electronic device 120 can receive a signal destined for the electronic device 110 from the communication node 130. The communication node 130 can recognize the first electronic device 120 as the electronic device 110. The communication node 130 can recognize the first electronic device 120 as the electronic device 110 based on a virtual ID contained in the first message received from the electronic device 110.

In the operations 2410 through 2440, the electronic device 110 can efficiently manage the power. The electronic device 110 can reduce the power consumption by transmitting and receiving signals through the first electronic device 120.

An electronic device according to various embodiments can include a controller (e.g., processor) and a communication interface operatively coupled to the controller. The controller can transmit to a first electronic device a first message using a proximity communication, for communicating with a second electronic device, and the first message can include first information enabling the first electronic device to communicate with the second electronic device on behalf of the electronic device. The controller can further receive from the first electronic device a second message using the proximity communication, and the second message can include data received at the first electronic device from the second electronic device on behalf of the electronic device.

When a first resource for communicating with the second electronic device substantially overlaps a second resource being used by the electronic device, the controller can transmit to the first electronic device the first message using the proximity communication. The first message can include the second information by which the first electronic device communicates with the second electronic device using the first resource on behalf of the electronic device.

When determining to need an additional CC for communicating with the second electronic device, the controller can transmit to the first electronic device the first message using the proximity communication, for communicating with the second electronic device. The first message can include the second information enabling the first electronic device to communicate with the second electronic device by using the additional CC on behalf of the electronic device.

When a remaining battery power in the electronic device is less than a threshold, the controller can transmit to the first electronic device the first message using the proximity communication, for communicating with the second electronic device.

An electronic device according to various embodiments can include a controller and a communication interface operatively coupled to the controller. The controller can receive from a first electronic device a first message using a proximity communication, and communicate with a second electronic device as the first electronic device based on the received first message. The first message can include an ID of the first electronic device and control data for communicating with the second electronic device.

The controller can further receive from the second electronic device data based on the received first message on behalf of the first electronic device, and, upon receiving data from the second electronic device, transmit to the first electronic device a second message using the proximity communication. The second message can include the received data.

The control data for communicating with the second electronic device can include resource information for receiving a sidelink discovery signal from the second electronic device, and the controller can receive from the second electronic device the sidelink discovery signal based on the resource information on behalf the first electronic device.

When the electronic device requires an additional CC, the first message can be transmitted from the first electronic device.

When a remaining battery power in the first electronic device is less than a threshold, the first message can be transmitted from the first electronic device.

A method for operating an electronic device according to various embodiments can include transmitting to a first electronic device a first message using a proximity communication, for communicating with a second electronic device. The first message can include information by which the first electronic device communicates with the second electronic device on behalf of the electronic device. The method can further include receiving from the first electronic device a second message using the proximity communication. The second message can include data received at the first electronic device receives from the second electronic device on behalf of the electronic device.

Transmitting the first message can include, when a first resource for communicating with the second electronic device substantially overlaps a second resource being used by the electronic device, transmitting to the first electronic device the first message using the proximity communication. The first message can include information by which the first electronic device communicates with the second electronic device using the first resource on behalf of the electronic device.

Transmitting the first message can include, when determining to need an additional CC for communicating with the second electronic device, transmitting to the first electronic device the first message using the proximity communication, for communicating with the second electronic device. The first message can include information by which the first electronic device communicates with the second electronic device using the additional CC on behalf of the electronic device.

Transmitting the first message can include, when a remaining battery power in the electronic device is less than a threshold, transmitting to the first electronic device the first message using the proximity communication, for communicating with the second electronic device.

A method for operating an electronic device according to various embodiments can include receiving from a first electronic device a first message using a proximity communication and communicating with a second electronic device on behalf of the first electronic device based on the received first message. The first message can include an ID of the first electronic device and control data for communicating with the second electronic device. Communicating with the second electronic device can further include receiving data from the second electronic device based on the received first message on behalf of the first electronic device, and, when receiving data from the second electronic device, transmitting to the first electronic device a second message using the proximity communication. The second message can include the received data.

The control data for communicating with the second electronic device can include resource information for receiving a sidelink discovery signal from the second electronic device. Communicating with the second electronic device can include receiving the sidelink discovery signal of the second electronic device based on the resource information on behalf of the first electronic device.

When the electronic device requires an additional CC, the first message can be transmitted from the first electronic device.

When the remaining battery power in the first electronic device is less than a threshold, the first message can be transmitted from the first electronic device.

The apparatus and its operating method according to various embodiments can efficiently utilize the communication resources by controlling the transmission and the reception.

The methods described in the claims or the specification according to various embodiments of the present disclosure can be implemented in software, firmware, hardware, or in their combinations.

As for the software, a computer-readable storage medium storing one or more programs (software modules) can be provided. One or more programs stored in the computer-readable storage medium can be configured for execution by one or more processors of the electronic device. One or more programs can include instructions for enabling the electronic device to execute the methods according to the various embodiments of the present disclosure.

Such a program (software module, software) can be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, the programs can be stored to a memory combining part or all of those recording media. A plurality of memories may be equipped.

The programs can be stored in an attachable storage device accessible via a communication network such as Internet, Intranet, local area network (LAN), wide LAN (WLAN), or storage area network (SAN), or a communication network by combining these networks. The storage device can access the electronic device through an external port. A separate storage device may access the electronic device over the communication network.

In the above-described various embodiments of the present disclosure, the elements included in the disclosure are expressed in a singular or plural form. However, the singular or plural expression is appropriately selected according to a proposed situation for the convenience of explanation and the disclosure is not limited to a single element or a plurality of elements. The elements expressed in the plural form may be configured as a single element and the elements expressed in the singular form may be configured as a plurality of elements.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a first electronic device in a wireless environment, the method comprising:
   receiving, from a base station, information indicating resources allocated to the first electronic device;
   in case that a battery level of the first electronic device is not greater than a predetermined level, transmitting, to an assisting electronic device by using a proximity communication path, a first message including:
      resource information for indicating the resources allocated to the first electronic device and authorizing the assisting electronic device to monitor at least one device-to-device (D2D) signal transmitted on the indicated resources,
      filtering information for indicating an identifier of the first electronic device and authorizing the assisting electronic device to identify at least one D2D signal associated with the indicated identifier,
      information for indicating at least one specific device including a second electronic device, and
      information for authorizing the assisting electronic device to perform decoding operations; and
   receiving, from the assisting electronic device by using the proximity communication path, a second message including data of the second electronic device in response to the first message,
   wherein the first message is used to receive, by the assisting electronic device, a D2D signal of the second electronic device,
   wherein the data of the second electronic device in the second message is obtained by the assisting electronic device based on a decoding of the D2D signal of the second electronic device in the assisting electronic device, and
   wherein the decoding operations include:
      a radio frequency (RF) processing for receiving the D2D signal to obtain an RF signal,
      a baseband processing for the RF signal to obtain a baseband signal, and
      a decoding for the baseband signal to obtain the data.

2. The method of claim 1,
   wherein the first message further includes information for indicating a modulation and coding scheme (MCS) level,
   wherein the resource information includes frequency information and time information that indicate the resources, and
   wherein the assisting electronic device is a wearable device including a receive radio frequency (RF) chain capable of receiving the D2D signal of the second electronic device on a cellular network.

3. The method of claim 1, further comprising:
   identifying a number of total component carriers (CCs) for a carrier aggregation (CA) associated with downlink signals of the base station;
   if a number of first CCs available to the first electronic device is not smaller than the identified number of total CCs, communicating with the base station without using the assisting electronic device; and
   if the number of the first CCs is smaller than the identified number of total CCs, transmitting, to the assisting electronic device, a control message including:
      information indicating that an additional CC is available, and
      information indicating resources in the additional CC for the CA.

4. The method of claim 1, further comprising:
   determining whether the first electronic device is located on a designated region of a cell-edge of the base station or not; and
   if the first electronic device is located on the designated region, determining whether the battery level of the first electronic device is greater than the predetermined level or not.

5. A method performed by an assisting electronic device in a wireless environment, the method comprising:
   receiving, from a first electronic device, a first message by using a proximity communication path, wherein the first message includes:
      resource information for indicating resources allocated to the first electronic device by a base station and authorizing the assisting electronic device to monitor at least one device-to-device (D2D) signal transmitted on the indicated resources,
      filtering information for indicating an identifier of the first electronic device and authorizing the assisting electronic device to identify at least one D2D signal associated with the indicated identifier,
      information for indicating at least one specific device including a second electronic device, and
      information for authorizing the assisting electronic device to perform decoding operations;
   receiving, from the second electronic device, a D2D signal of the second electronic device based on the received first message;
   obtaining data of the second electronic device by decoding the D2D signal of the second electronic device; and
   transmitting, to the first electronic device, a second message including the data of the second electronic device by using the proximity communication path in response to the first message, wherein the first message is transmitted in case that a battery level of the first electronic device is not greater than a predetermined level, and wherein the decoding operations include:
- a radio frequency (RF) processing for receiving the D2D signal to obtain an RF signal,
- a baseband processing for the RF signal to obtain a baseband signal, and
- a decoding for the baseband signal to obtain the data.

6. The method of claim 5,
wherein the first message further includes information for indicating a modulation and coding scheme (MCS) level,
wherein the resource information includes frequency information and time information that indicate the resources, and
wherein the assisting electronic device is a wearable device including a receive radio frequency (RF) chain capable of receiving the D2D signal of the second electronic device on a cellular network.

7. The method of claim 5, further comprising:
receiving, from the first electronic device, a control message including:
- information indicating that an additional component carrier (CC) is available, and
- information indicating resources in the additional CC for a carrier aggregation (CA), wherein the control message is transmitted in case that a number of first CCs available to the first electronic device is smaller than a number of total CCs for the CA associated with downlink signals of the base station.

8. The method of claim 5, wherein the first message is transmitted in case that the battery level of the first electronic device is not greater than the predetermined level and the first electronic device is located on a designated region of a cell-edge of the base station.

9. A first electronic device in a wireless environment, the first electronic device comprising:
- at least one processor; and
- at least one transceiver operatively coupled to the at least one processor, wherein the at least one processor is configured to:
- receive, from a base station, resource information indicating resources allocated to the first electronic device,
- in case that a battery level of the first electronic device is not greater than a predetermined level, transmit, to an assisting electronic device by using a proximity communication path, a first message including:
  - resource information for indicating the resources allocated to the first electronic device and authorizing the assisting electronic device to monitor at least one device-to-device (D2D) signal transmitted on the indicated resources,
  - filtering information for indicating an identifier of the first electronic device and authorizing the assisting electronic device to identify at least one D2D signal associated with the indicated identifier,
  - information for indicating at least one specific device including a second electronic device, and
  - information for authorizing the assisting electronic device to perform decoding operations, and
- receive, from the assisting electronic device by using the proximity communication path, a second message including data of the second electronic device in response to the first message, wherein the first message is used to receive, by the assisting electronic device, the D2D signal of the second electronic device, wherein the data of the second electronic device in the second message is obtained by the assisting electronic device based on a decoding of the D2D signal of the second electronic device in the assisting electronic device, and wherein the decoding operations include:
- a radio frequency (RF) processing for receiving the D2D signal to obtain an RF signal,
- a baseband processing for the RF signal to obtain a baseband signal, and
- a decoding for the baseband signal to obtain the data.

10. The first electronic device of claim 9, wherein the at least one processor is further configured to:
- identify a number of total component carriers (CCs) for a carrier aggregation (CA) associated with downlink signals of the base station,
- if a number of first CCs available to the first electronic device is not smaller than the identified number of total CCs, communicate with the base station without using the assisting electronic device; and
- if the number of the first CCs is smaller than the identified number of total CCs, transmit, to the assisting electronic device, a control message including:
  - information indicating that an additional CC is available, and
  - information indicating resources in the additional CC for the CA.

11. The first electronic device of claim 9, wherein the at least one processor is further configured to:
- determine whether the first electronic device is located on a designated region of a cell-edge of the base station or not, and
- if the first electronic device is located on the designated region, determine whether the battery level of the first electronic device is greater than the predetermined level or not.

12. An assisting electronic device in a wireless environment, the assisting electronic device comprising:
- at least one processor; and
- at least one transceiver operatively coupled to the at least one processor, wherein the at least one processor is configured to:
- receive, from a first electronic device, a first message by using a proximity communication path, wherein the first message includes:
  - resource information for indicating resources allocated to the first electronic device by a base station and authorizing the assisting electronic device to monitor at least one device-to-device (D2D) signal transmitted on the indicated resources,
  - filtering information for indicating an identifier of the first electronic device and authorizing the assisting electronic device to identify at least one D2D signal associated with the indicated identifier,
  - information for indicating at least one specific device including a second electronic device, and
  - information for authorizing the assisting electronic device to perform decoding operations,
- receive, from the second electronic device, a D2D signal of the second electronic device based on the received first message,
- obtain data of the second electronic device by decoding the D2D signal of the second electronic device, and transmit, to the first electronic device, a second message including the data of the second electronic device by using the proximity communication path in response to the first message, wherein the first message is transmitted in case that a battery level of the first electronic device is not greater than a predetermined level, and wherein the decoding operations include:
- a radio frequency (RF) processing for receiving the D2D signal to obtain an RF signal,
- a baseband processing for the RF signal to obtain a baseband signal, and
- a decoding for the baseband signal to obtain the data.

13. The assisting electronic device of claim 12, wherein the first message further includes information for indicating a modulation and coding scheme (MCS) level, wherein the resource information includes frequency information and time information that indicate the resources, and wherein the assisting electronic device is a wearable device including a receive radio frequency (RF) chain capable of receiving the D2D signal of the second electronic device on a cellular network.

14. The assisting electronic device of claim 12, wherein the at least one processor is further configured to:
receive, from the first electronic device, a control message including:
- information indicating that an additional component carrier (CC) is available, and
- information indicating resources in the additional CC for a carrier aggregation (CA), and wherein the control message is transmitted in case that a number of first CCs available to the first electronic device is smaller than a number of total CCs for the CA associated with downlink signals of the base station.

15. The assisting electronic device of claim 12, wherein the first message is transmitted in case that the battery level of the first electronic device is not greater than the predetermined level and the first electronic device is located on a designated region of a cell-edge of the base station.

16. A non-transitory computer-readable storage medium configured to store one or more computer programs including instructions that, when executed by at least one processor in a first electronic device, cause the at least one processor to control for:

receiving, from a base station, resource information indicating resources allocated to the first electronic device;

in case that a battery level of the first electronic device is not greater than a predetermined level, transmitting, to an assisting electronic device by using a proximity communication path, a first message including:
- resource information for indicating the resources allocated to the first electronic device and authorizing the assisting electronic device to monitor at least one device-to-device (D2D) signal transmitted on the indicated resources,
- filtering information for indicating an identifier of the first electronic device and authorizing the assisting electronic device to identify at least one D2D signal associated with the indicated identifier,
- information for indicating at least one specific device including a second electronic device, and
- information for authorizing the assisting electronic device to perform decoding operations; and receiving, from the assisting electronic device by using the proximity communication path, a second message including data of the second electronic device in response to the first message, wherein the first message is used to receive, by the assisting electronic device, the D2D signal of the second electronic device, wherein the data of the second electronic device in the second message is obtained by the assisting electronic device based on a decoding of the D2D signal of the second electronic device in the assisting electronic device, and wherein the decoding operations include:
- a radio frequency (RF) processing for receiving the D2D signal to obtain an RF signal,
- a baseband processing for the RF signal to obtain a baseband signal, and
- a decoding for the baseband signal to obtain the data.

* * * * *